(12) United States Patent
Leonhardt et al.

(10) Patent No.: US 11,835,311 B2
(45) Date of Patent: Dec. 5, 2023

(54) DEVICES, SYSTEMS, AND COMPUTER PROGRAM PRODUCTS FOR DETECTING GUNSHOTS AND RELATED METHODS

(71) Applicant: Pull Count, LLC, Macclessfield, NC (US)

(72) Inventors: Gary Leonhardt, Macclessfield, NC (US); Ruben Masso, Nagykanizsa (HU); Jon Buttram, Raleigh, NC (US); Andrew Starling, Farmville, NC (US)

(73) Assignee: Pull Count, LLC, Macclessfield, NC (US)

( * ) Notice: Subject to any disclaimer, the term of this patent is extended or adjusted under 35 U.S.C. 154(b) by 30 days.

(21) Appl. No.: 17/526,942

(22) Filed: Nov. 15, 2021

(65) Prior Publication Data
US 2022/0214124 A1    Jul. 7, 2022

Related U.S. Application Data

(60) Provisional application No. 63/113,630, filed on Nov. 13, 2020.

(51) Int. Cl.
| | |
|---|---|
| *F41A 17/06* | (2006.01) |
| *G06N 3/08* | (2023.01) |
| *F41A 19/01* | (2006.01) |
| *F41C 27/00* | (2006.01) |

(52) U.S. Cl.
CPC ............ *F41A 17/063* (2013.01); *F41A 19/01* (2013.01); *F41C 27/00* (2013.01); *G06N 3/08* (2013.01)

(58) Field of Classification Search
CPC .......... F41A 17/063; F41A 19/01; G06N 3/08
See application file for complete search history.

(56) References Cited

U.S. PATENT DOCUMENTS

| | | | | |
|---|---|---|---|---|
| 5,005,307 A | * | 4/1991 | Horne | F41A 9/62 42/1.02 |
| 5,142,805 A | * | 9/1992 | Horne | F41A 19/01 42/1.02 |
| 5,406,730 A | * | 4/1995 | Sayre | F41A 9/62 42/84 |

(Continued)

OTHER PUBLICATIONS

Esposito et al., "A Piezoresistive Sensor to Measure Muscle Contraction and Mechanomyography", Sensors, 2018, vol. 18, 12 pages.

(Continued)

*Primary Examiner* — Joshua E Freeman
(74) *Attorney, Agent, or Firm* — Michael Best & Friedrich LLP

(57) ABSTRACT

Devices, systems, computer program products and methods for detecting gunshots is provided. The method and associated system can include a device which is coupled to a user or firearm. The device can include an accelerometer and a microphone for detecting movements and sounds, respectively. The device can be trained by firing rounds from the firearm under predetermined conditions. Analysis of the training results in creating a data signature for the particular firearm. Gunshots can be then detected by using the data signature and comparing the data signature to the movements and/or sounds captured. The number of rounds left in the firearm can then be displayed to the user for easy viewing.

22 Claims, 16 Drawing Sheets

(56) References Cited

U.S. PATENT DOCUMENTS

| | | | | |
|---|---|---|---|---|
| 5,566,486 | A * | 10/1996 | Brinkley | F41A 19/01 42/1.03 |
| 5,799,432 | A * | 9/1998 | Wright, Sr. | F41A 9/62 42/1.02 |
| 6,708,136 | B1 * | 3/2004 | Lahiff | A63B 71/06 368/278 |
| 6,785,996 | B2 * | 9/2004 | Danner | F41A 17/06 42/70.08 |
| 7,234,260 | B2 * | 6/2007 | Acarreta | F41A 9/62 42/1.01 |
| 7,730,654 | B2 | 6/2010 | Kim | |
| 8,176,667 | B2 | 5/2012 | Kamal et al. | |
| 8,191,297 | B2 | 6/2012 | Gwillim, Jr. | |
| 9,435,598 | B2 * | 9/2016 | Seckman | F41A 9/62 |
| 10,254,066 | B1 | 4/2019 | Petersen et al. | |
| 10,648,781 | B1 * | 5/2020 | Behiel | F41A 33/00 |
| 2005/0155420 | A1 * | 7/2005 | Johnson | F41A 19/01 73/167 |
| 2008/0282595 | A1 * | 11/2008 | Clark | F41A 19/01 42/1.01 |
| 2009/0084015 | A1 * | 4/2009 | Compton | F41A 19/01 42/1.02 |
| 2010/0299985 | A1 * | 12/2010 | Delgado Acarreta | F41A 19/01 42/1.03 |
| 2011/0072703 | A1 * | 3/2011 | Ferrarini | F41A 19/01 42/1.01 |
| 2014/0378088 | A1 * | 12/2014 | Goel | H04W 4/029 455/404.2 |
| 2015/0226505 | A1 * | 8/2015 | Amit | F41A 19/01 42/1.02 |
| 2016/0033221 | A1 * | 2/2016 | Schmehl | F41A 33/00 42/90 |
| 2016/0069629 | A1 * | 3/2016 | Seckman | F41A 9/62 42/1.01 |
| 2018/0156644 | A1 * | 6/2018 | Lienhart | F41A 19/01 |
| 2019/0024998 | A1 * | 1/2019 | Chan | F41A 19/01 |
| 2020/0011629 | A1 * | 1/2020 | Deng | G01S 19/18 |
| 2020/0355456 | A1 * | 11/2020 | Deng | H04N 23/66 |
| 2020/0355457 | A1 * | 11/2020 | Deng | G01S 5/0009 |
| 2021/0123707 | A1 * | 4/2021 | Baskett | F41A 17/063 |
| 2021/0199400 | A1 * | 7/2021 | Weiss | F41G 3/02 |
| 2021/0389080 | A1 * | 12/2021 | McMillan | F41C 33/029 |

OTHER PUBLICATIONS

Loeffler, "Detecting Gunshots Using Wearable Accelerometers", PLOS One, 2014, vol. 9, No. 9, pp. 1-6.

Maher et al., "Gunshot acoustics: pistol vs. revolver", Audio Engineering Society Conference Paper, 2017, 7 pages.

Maher et al., "Shot-to-shot variation in gunshot acoustics experiments", Audio Engineering Society Conference Paper, 2019, 8 pages.

Murphy et al., "The reduction of gunshot noise and auditory risk through the use of firearm suppressors and low-velocity ammunition", International Journal of Audiology, 2018, vol. 57, pp. S28-S41.

* cited by examiner

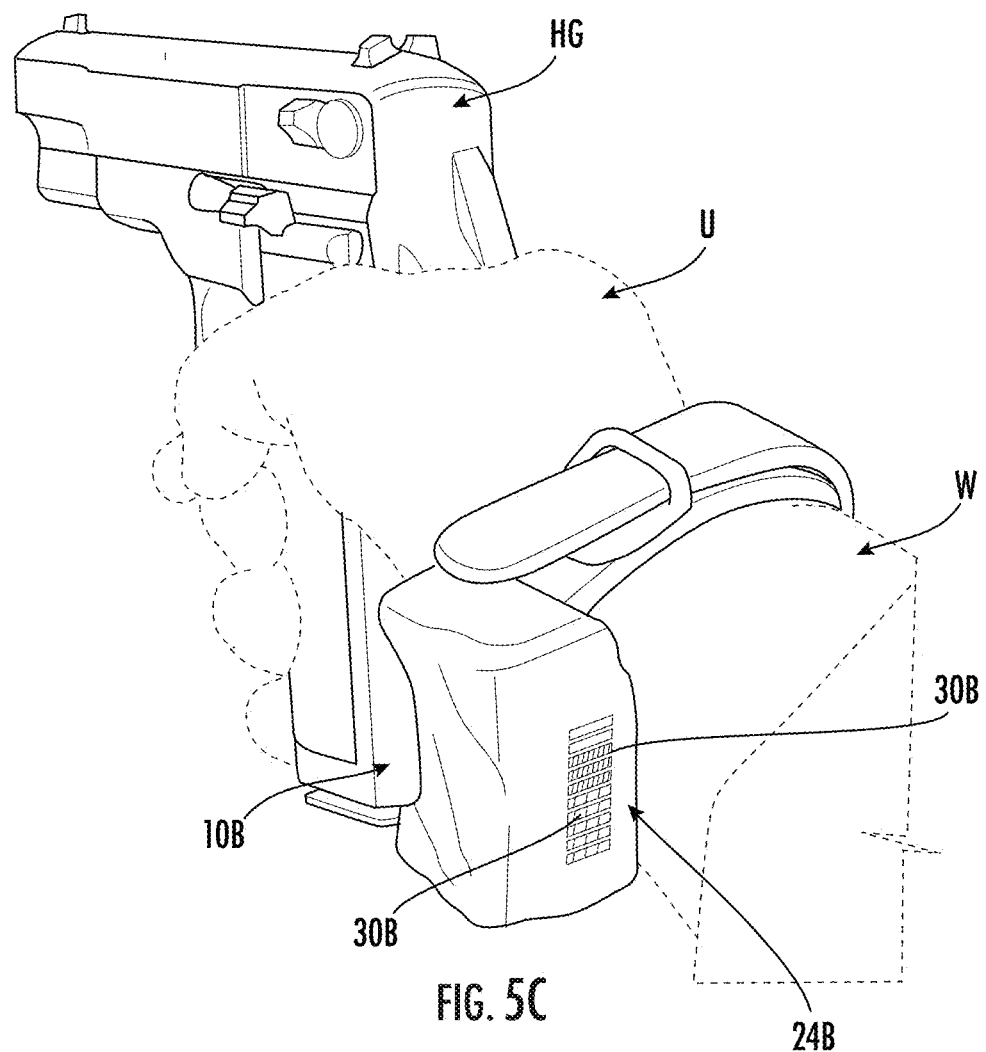

DEVICES, SYSTEMS, AND COMPUTER PROGRAM PRODUCTS FOR DETECTING GUNSHOTS AND RELATED METHODS

RELATED APPLICATIONS

The presently disclosed subject matter claims the benefit of U.S. Provisional Patent Application Ser. No. 63/113,630, filed Nov. 13, 2020, the disclosure of which is incorporated herein by reference in its entirety.

TECHNICAL FIELD

The presently disclosed subject matter is directed towards a system, along with related devices and computer program products for detecting gunshots detected from a selected/specific firearm. Specifically, the wearable may display to a user the number of rounds left in, a firearm and collect and analyze information related to each gunshot based on the gunshots detected.

BACKGROUND

When using firearms, it s difficult to keep track of the number of shots remaining. This is particularly true when firearms are being used in lure interactions, whet adrenaline is pumping, and full attention must be given to the situation at hand. Although there are a number of systems, devices and methods enabling the detection of gunshots, there remains a need for systems, devices, and methods for detecting the number of gunshots from a particular user's firearm. Specifically, the detection of gunshots may be used to determine how many rounds are left to be fired. As described herein, such systems, devices and methods will need to filter and cancel out unwanted noise and/or other gunshots while accurately identifying gunshots originating solely from the user's particular firearm. Further, the device described herein may be worn on the user's body so that display of the number of rounds remaining is easily viewable by the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

According to at least one embodiment of the disclosed subject matter, a system for detecting and displaying rounds remaining is provided. The method of using the system includes coupling a device including an accelerometer and a microphone to a user or a firearm; training the device by firing rounds from a firearm; detecting a mechanical action from the firearm; detecting a sound wave from the firearm relating the ejection of a bullet from the firearm; displaying a number on the device indicating a number of bullets left in the firearm.

The present subject matter also relates to computer program products for detecting and counting gunshots and displaying rounds remaining. Aspects of the subject matter described herein may be implemented in software, in combination with hardware and/or firmware. For example, the subject matter described herein may be implemented in software executed by a hardware-enabled processor. In one exemplary implementation, the subject matter described herein of detecting and counting gunshots and displaying rounds remaining may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms. Further, it should be noted that the systems and methods utilize and can comprise accelerometers and/or microphones to capture information that can be processed to identify a motion fingerprint of a gunshot and recoil to train the device to detect a round being fired from a firearm and a display device that displays the remaining rounds in the firearm based on the shots detected as described herein. These detection systems, accelerometers, microphones, and display devices constitute special purpose devices that improve the technological field of providing a reliable manner for determining and display remaining rounds left in a firearm.

While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow proceeds when taken in connection with the accompanying drawings as best described hereinbelow.

BRIEF DESCRIPTION OF THE DRAWINGS

The foregoing, as well as the following Detailed Description of preferred embodiments, is better understood when read in conjunction with the drawings included herein. For the purposes of illustration, there is shown in the drawings exemplary embodiments; however, the presently disclosed subject matter is not limited to the specific methods and instrumentalities disclosed. A full and enabling disclosure of the present subject matter including the best mode thereof to one of ordinary skill in the art is set forth more particularly in the remainder of the specification, including reference to the accompanying figures, in which:

FIG. 5C depicts a rear perspective view of the er holding the handgun according to FIG. 5A with the embodiment of the wearable gunshot accounting device displaying indicators representative of the number of rounds remaining after a round has been fired from the handgun according to the presently disclosed subject matter;

Figure 1A:
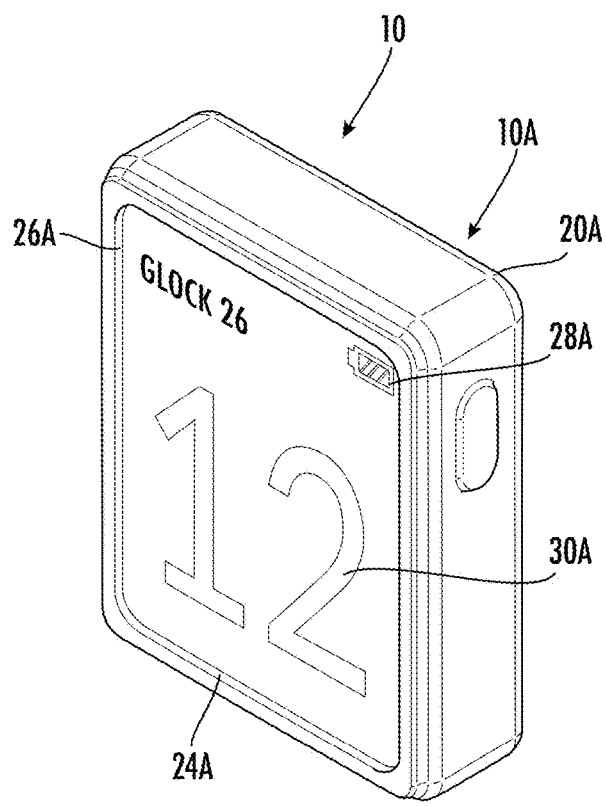
FIGS. 1A and 1B depict a perspective view and side elevation view of an embodiment of a wearable gunshot accounting device for displaying remaining rounds according presently disclosed subject matter.

Repeat use of reference characters in the present specification and drawings is intended to represent the seam or analogous features or elements of the present subject matter.

DETAILED DESCRIPTION

These descriptions are presented with sufficient details to provide an understanding of one or more particular embodiments of broader inventive subject matters. These descriptions expound upon, and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term step may be expressly used or implied relating to features of processes or methods, no implication is made of any particular order or sequence among such expressed or implied steps unless an order or sequence is explicitly stated.

Although the terms first, second, right, left, front, back, top, bottom, etc. may be used herein to describe various features, elements, components, regions, layers and/or sections, these features, elements, components, regions, layers and/or sections should not be limited by these terms. These terms are only used to distinguish one feature, element, component, region, layer, or section from another feature, element, component, region, layer or section. Thus a first feature, element, component, region, layer, or section discussed below could be termed a second feature, element, component, region, layer, or section without departing from the teachings of the disclosure herein.

Similarly, when a feature or element is being described in the present disclosure as "on" or "over" another feature or element, it is to be understood that the features or elements can either be directly contacting each other or have another feature or element between the unless expressly stated to the contrary. Thus, these terms are simply describing the relative position of the features or elements to each other and do not necessarily mean "on top of" since the relative position above car below depends upon the orientation of the device to the viewer.

Embodiments of the subject matter of the disclosure are described herein with reference to schematic illustrations of embodiments that may be idealized. As such, variations from the shapes and/or positions of features, elements, or components within the illustrations as a result, of, for example but not limited to, user preferences, manufacturing techniques and/or tolerances are expected. Shapes, sizes and/or positions of features, elements or components illustrated in the figures may also be magnified, minimized, exaggerated, shifted, or simplified to facilitate explanation of the subject latter disclosed herein. Thus, the features, elements or components illustrated in the figures are schematic in nature and their shapes and/or positions are not intended to illustrate the precise configuration of the subject matter and are trot necessarily intended to t the scope of the subject matter disclosed herein unless it specifically stated otherwise herein.

Any dimensions expressed or it implied in the drawings and, these descriptions are provided for exemplary purposes. Thus, not all embodiments within the scope of the drawings and these descriptions are lade according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing at least one embodiment is made according to the apparent relative scale of the drawing.

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5 and from about 3.2 to about 6.5.

Following long-standing patent law convention, the terms "a," "an," and "the" refer to "one" or more when used in this application including the claims. Thus for example reference to "a subject" includes a plurality of subjects, unless the context clearly is to the contrary (e.g., a plurality of subjects), and so forth.

"Computing device(s)," as used herein means one or more programmable logic controllers (PLC), micro-computers, desktop computers, laptop computers, set-top devices, tablet computers, mobile devices, mobile smart devices, smartphones, servers, other hardware, and/or the like. In some embodiments, the computing device may be provisioned with a hardware-based processor that is configured to execute computer program products, such as software programs or applications.

"Computer program product(s)," "computer program(s)," "program(s)" as used herein means programs stored memory and performed or executed by a processor, such as a central processing unit (CPU), on a computing device and can include but is not limited to software applications and firmware. The computer program product(s) can be in the form of a non-transitory computer readable media comprising computer executable instructions embodied in a computer readable medium that when executed by a processor of a computer or computing device can control of the computer or computing device such that the computer or computing device can perform specific steps.

"Software" or "Software application" as used herein means a computer program product for and used on a computer, which can include, but is not limited to a mobile computing device or a vehicle computing device with interactive capabilities, that can be in the form of a non-transitory computer readable media comprising computer executable instructions embodied in a computer readable medium that when executed by a processor of a computer or computing device can control of the computer or computing device such that the computer or computing device can perform specific steps.

"Gunshot accounting device" as used herein means a device used to detect the rounds fired from a firearm and determine how many rounds are left available in the firearm for firing, which may include the counting of rounds fired.

"Extracted feature(s)" as used herein means data point(s) selectively pulled from data collected by one or more sensors that are indicative of an event occurring based on the selected data points. For example, the data points can be selectively pulled from sensor data collected by one or more sensors using a computer program product, such as a filter, to aggregate the selected data points for analyzation to determine if a round has been fired from a firearm.

"Motion sensor(s)" as used herein means sensor that are used to collect data relate to motion or movement and can include, but are not limited to, at least one of accelerometers, gyroscopes, and/or magnetometers and inertial measurement units that can comprise one or more gyroscopes, one or more accelerometers, and one or more magnetometers.

"Motion fingerprint" as used herein means an aggregation of extracted features from motion sensor data that can be compiled in such a manner that it can be analyzed by an artificial intelligence to determine if a round has been fired from a firearm. For example, the compilation of extracted features can include, but is not limited to one or more graphs of extracted features, one or more spectrograms of extracted, features, one or more data tables of extracted features, or the like.

"Sound fingerprint" as used herein means an aggregation of extracted features from audio sensor data that can be compiled in a manner that it can be analyzed by an artificial intelligence to determine if a round has been fired from a firearm. For example, the compilation of extracted features can include, but is not limited to one or more graphs of extracted features, or ore spectrograms of extracted features, one or more data tables, of extracted features, or the like.

"Filter(s)," "filter programs," or "feature provider(s)" as used herein means one or more software application(s) used to extract extracted features from sensor data and compile the extracted features for further analysis.

"Artificial intelligence," "artificial intelligence system," "AI," or "AI systems" as used herein means one or more computer program products that are used to simulate human intelligence by being able to perform tasks that normally require human intelligence, such as visual perception, speech recognition, decision-making, and the like. "Artificial intelligence" can use difference types of algorithms to perform such task. Such algorithms can include, but are not limited to classification algorithms, regression algorithms, clustering algorithms, or the like. "Artificial intelligence" can comprise machine learning software applications, deep learning software applications, neural networks, which may be included in deep learning software applications, and the like.

The presently disclosed subject matter relates to and includes the subject matter of U.S. Provisional Patent Application Ser. No. 63,113,630, filed Nov. 13, 2020, entitled Systems and Wearable Devices for Detecting Gunshots, the disclosure of which is incorporated herein by reference in its entirety. The present subject matter relates to gunshot accounting devices that are lightweight and can be worn by a firearm user or attached to a firearm, such as a handgun or a rifle, to detect gunshots from the firearm being used by the user to determine the number of shots fired and the number of rounds remaining within the firearm after the firing of each shot and related gunshot accounting systems that can include one or more gunshot accounting devices. The present subject matter also relates to methods of use and computer program products related to the gunshot accounting device.

The gunshot accounting device of the present subject matter can be used to count rounds fired by a firearm bile the user of the firearm is out in the field in their respective line of duty. In some embodiments a gunshot accounting device can comprise a housing and a display secured to the housing. For example, the display can be incorporated into the housing. The gunshot accounting device can also comprise one or more sensors residing in the housing with the one or more sensors configured to collect sensor data and a memory for storing computer program products and a processor residing in the housing and in communication with the one or more sensors and the display. The processor can be configured to execute a filter and an artificial intelligence that can comprise a neural network stored within the memory. In particular, the processor performing the steps of receiving the sensor data from the one or more sensors, and analyzing the sensor data using the filter and the artificial intelligence to determine if a round has been fired from a firearm held by a user using the gunshot accounting device. The display can then display an indication that a round has been fired from the firearm held by the user on the display if there is a determination that a round was fired based on the analysis of the sensor data.

The one or more sensors can comprise one or more motion sensors for measuring motion and collecting motion data and one or more processors and memory for processing information generated by the measurements taken by the one or more motion sensors. For example, the one or more motion sensors can include an internal motion unit that includes one more accelerometers, gyroscopes, and magnetometers. The gyroscopes can provide a measure angular rate, while the accelerometers can provide a measure specific force/acceleration and the magnetometers can provide measurement of the magnetic field surrounding the system to provide orientation to the system for determining movements.

The processor can comprise an ARM processor, for example, M4F ARM processor. The gunshot accounting device can include a battery, a regulator, and a charger. The filter can be a software application for extracting important features from the motion data taken by the one or more motion sensors. The artificial intelligence can be a software application that can include a neural network that can be used to learn and recognize a motion fingerprint of a gunshot from a firearm in real time. For example, a Keras/tensorflow deep learning artificial intelligence computer program product can be used within the gunshot accounting devices and systems. In some embodiments, the gunshot accounting device can comprise one or more microphones for detecting the firing of a handgun, rifle or other. Such a gunshot accounting device can comprise a filter for extracting important features within the sound data collected by the microphone. The system can also comprise a neural network and artificial intelligence that are used to learn and recognize a sound signature of a gunshot from a firearm in real time based on the sound data collected by the microphone.

In some embodiments, the gunshot accounting device can be a wearable. device that can be worn by the user or can be secured to an article of clothing worn by the user. For example, the wearable device can be worn on the arm, for example, the wrist of the hand that the user uses to fire the firearm. In some embodiments, the gunshot accounting device can be secured to a strap for securing the gunshot accounting device to the wrist of the user. In some embodiments, the gunshot accounting device can comprise an attachable device that can be secured to a firearm. For example, the gunshot accounting device can be secured to picatinny rails of a firearm. For example, the attachable gunshot accounting device can be attached to a picatinny rail of a rifle or a handgun and/or integrated into other systems such as heads-up display (HUD) and eyeglasses, helmets or other headgear.

As stated, the gunshot accounting device can include a housing in which the processor and memory as well as the battery and the regulator can reside. Further, an accelerometer can be incorporated into the housing and can be in communication with processor and the memory. For example, the accelerometer can be an Inertial Measurement Unit ("IMU") accelerometer, which can include a gyroscope, an accelerometer, and a magnetometer to provide a variety of motion and movement related measurement data. In some embodiments, a pressure switch located on the firearm trigger can be used to send signals to the receiver in the gunshot accounting device to indicate the activating of the trigger to initiate firing sequence. Additionally, in some embodiments, an audio sensor can be incorporated in the housing to collect sound, or audio, data and can be in communication with the processor and the memory. The audiosensor can be, for example, one or more microphones with a variety of configurations and shielding options to take into consideration various conditions of firearm use. The display (which can include an LED indicator, a speaker and/or a vibrating device all of which are designed to notify the user of remaining ammunition) can be attached to the housing. For example, in some embodiments, the display can comprise an LED indicator can be representative of the numbers of rounds still available to be fired by the firearm (whether displaying an actual integer number, using sequenced lights in a linear fashion with specific color changes to, indicate rounds expended and/or still remaining).

A filter that can extract the measurement features from the measurement data can be a computer program stored in the memory and executed by the processor. For example, data can be collected by motion sensors, such as a gyroscope, an accelerometer, and/or a magnetometer, and/or sound (audio) sensors, such as one or more microphones, that can collect data when a round is fired from a firearm. Features from the data can be extracted using the filter. An artificial intelligence, which can include a neural network, can also comprise one or more computer program products stored in the memory and executed by the processor of the gunshot accounting device and/or on a remote computing device that is in operable communication with the processor of the gunshot accounting device. The artificial intelligence can analyze the extracted feature data and can use that analysis to learn and then recognize a motion fingerprint of a gunshot from a specific firearm in real time and/or earn and then recognize a sound wave signature of a gunshot from a firearm in real time. Once the extracted feature data has been analyzed and the artificial intelligence has confirmed that a round has been fired, the display can then provide a count display that is representative of the number of rounds still available to be fired from the firearm by the user.

The present subject matter also provides a gunshot accounting system that can include one or more gunshot accounting devices and one or more other computing devices in communication with the one or more gunshot accounting devices. The one or more other computer devices can each comprise a memory and a processor. The one or more computing devices can be a mobile smart device, such as a smart phone, a portable computing device like a tablet or laptop, or a stationary or remote computing device such as desktop computer. The one or more computing devices depending on there location relative to the gunshot accounting device can be in operable communication via a wired connection or a wireless connection. For example, a user can connect a mobile smart device or a laptop to the gunshot accounting device through a wired connection or a wireless connection using a local network using Bluetooth or a WI-FI network, or through a cellular network. The one or more computing devices can provide for further processing, analyzing, and/or storage of the sensor data and/or extracted features. Remote computer devices can be operated by a third party or by the operators of the gunshot counter system. The gunshot accounting device shares the sensor data collected from the at least one sensor and the analysis of the extracted features with the one or more computing devices. For example, in some embodiments, the processor of the first computing device executes instructions stored on the memory of the one or more computing devices to further analyze the sensor data. In some embodiments, the processor of the first computing device executes instructions stored on the memory of the one or more computing devices to further analyze the extracted features.

Referring to FIGS. 1A-8, gunshot counter systems that comprise gunshot accounting devices, generally 10, that can be used by a user U to identify and register when a gunshot has been fired from a firearm FA for counting gunshots fired from the firearm FA to enable a determination of the number of rounds remaining in the firearm FA available for use. The system and the gunshot accounting devices 10 may include software and hardware for ensuring, with a high accuracy, that the gunshots counted correspondingly were only fired from the firearm FA being utilized by the user U. The gunshot accounting devices 10 can comprise different types of devices that can be used in different locations relative to the user U and the firearm FA as show in FIGS. 1A-4B for capturing data related to the firing of the firearm FA.

Figure 1B:
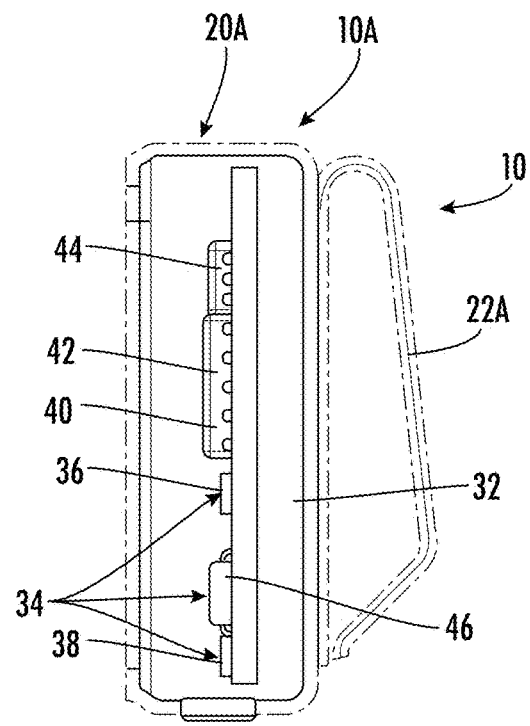

Referring to FIGS. 1A and 1B, a gunshot accounting device 10 is provided, in the form an attachable gunshot accounting device 10A that can be secured to an article of clothing such as a sleeve of a shirt, coat or pullover. Alternatively, in some embodiments, the gunshot accounting device 10A can be secured to a wristband, arm band, or other accessory worn by a user. For example, the wristband or arm band can be worn in the arm of the user used to hold and fire the firearm FA (see FIG. 2C). The gunshot accounting device 10A may include a housing 20A for containing and protecting components of the gunshot accounting device 10A therewithin and a fastener or attachment device 22A for attaching the gunshot accounting device 10A to the user, such as an article of clothing worn by the user or another wearable accessory or piece of equipment. In some embodiments, the fastener 22A can comprise one of more of the following: hook and loop fasteners, a clip, a male or female button, a band, or any other feature capable of selective engagement with a user, another wearable accessory or piece of equipment.

As depicted in FIG. 1A, the gunshot accounting device 10A can also comprise a display 24A on one side or face of the housing 20A for displaying information to the user. The display 24A may include a firearm indicator 26A for indicating the firearm currently being used by the user and therefore detected by the gunshot accounting device 10A. The display 24A of the gunshot accounting device 10A can also comprise a battery indicator 28A for displaying the amount of battery charge left in the gunshot accounting device 10A. Further, the display 24A of the gunshot accounting device 10A can comprise a rounds indicator 30A for displaying the number of rounds remaining in the user's firearm. The display 24A of the gunshot accounting device 10A may also comprise other indicators for displaying other information. The display 24A may also include one or more inputs for receiving commands from the user. The input(s) may be a haptic surface or some other tactile feature. The display 24A of the gunshot accounting device 10A may be positioned on an exterior surface of the housing 20A for viewing by the user. The display 24A may include one or more light indications, such as light emitting diodes. The background or theme of the display 24A of the gunshot accounting device 10A may change (e.g., from green to yellow to orange to red) to indicate that the number of rounds remaining is approaching zero, or some other information. The input(s) may be utilized so that the user may provide the number of rounds capable of being loaded in the magazine of the firearm and/or the number of rounds actually in the firearm.

Figure 2A:
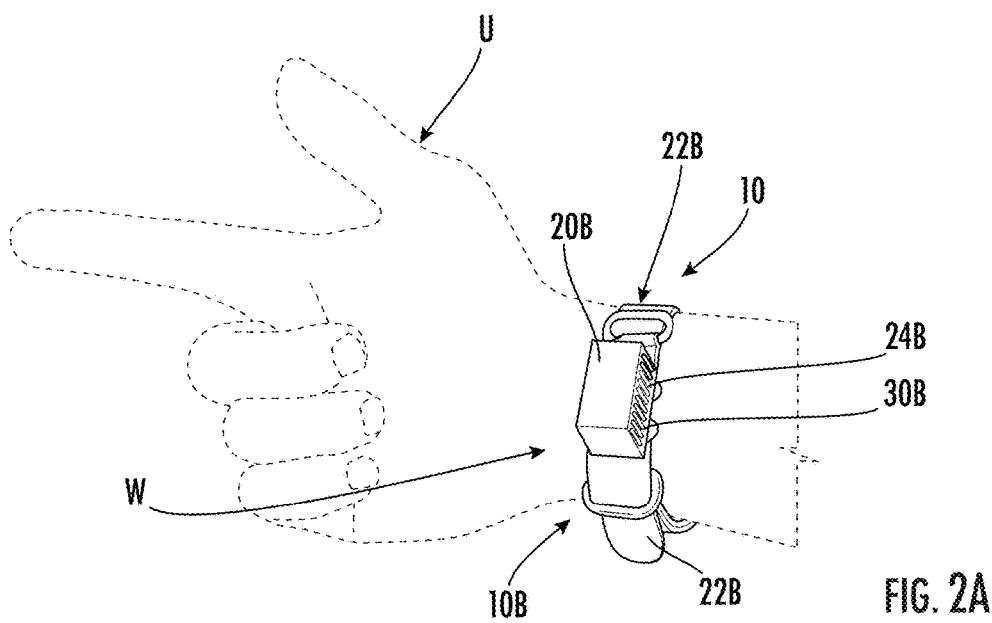
FIGS. 2A and and 2B depict a perspective views of another embodiment of a wearable gunshot accounting device for displaying remaining rounds that can be worn on a wrist of a shooting hand of a user according presently disclosed subject matter.
Figure 2B:
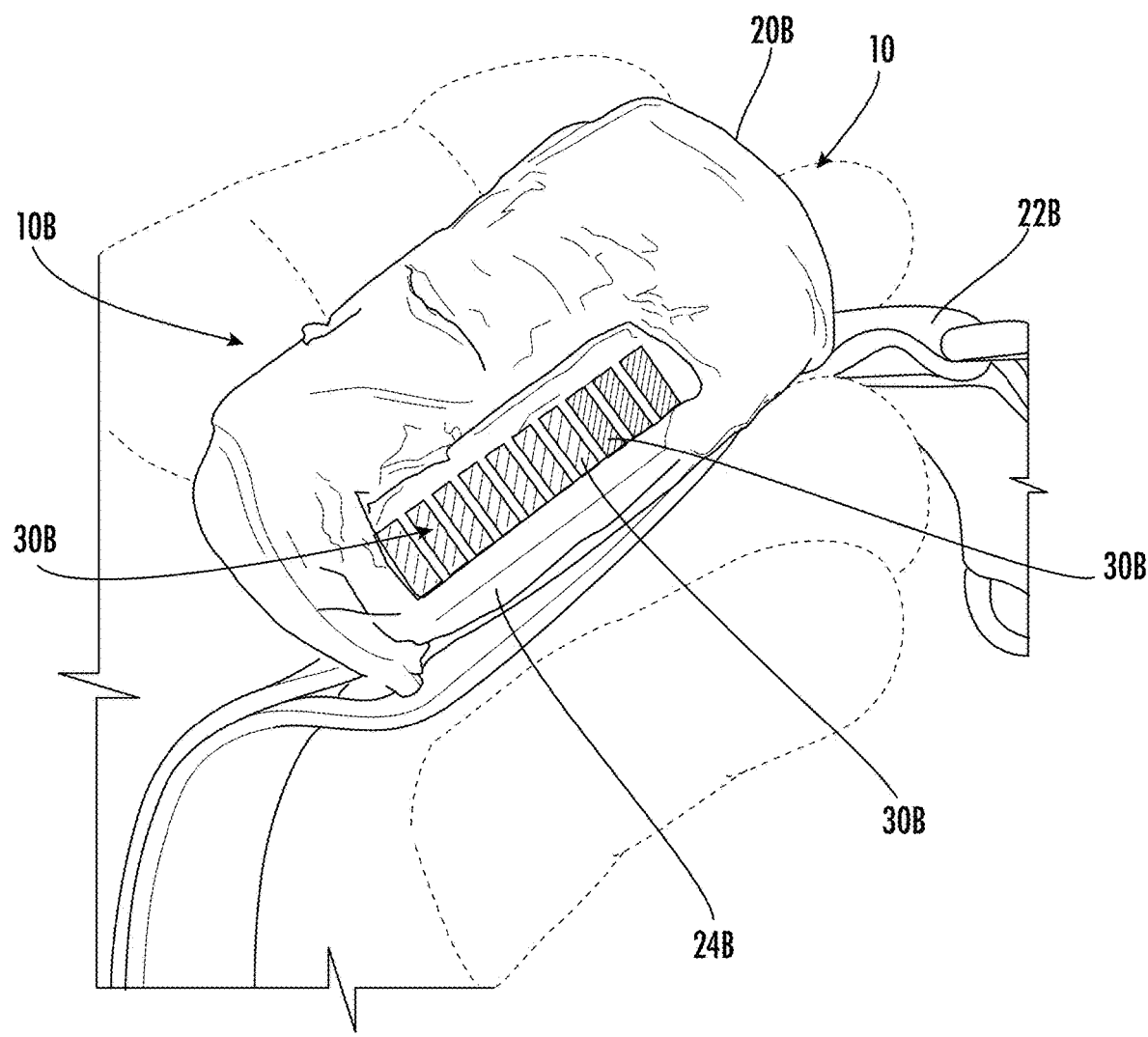
FIG. 2C depicts the embodiment of the gunshot accounting device according to FIG. 1 in use on a wrist of a user while the user shoots a handgun according to the presently disclosed subject matter.
Figure 2C:
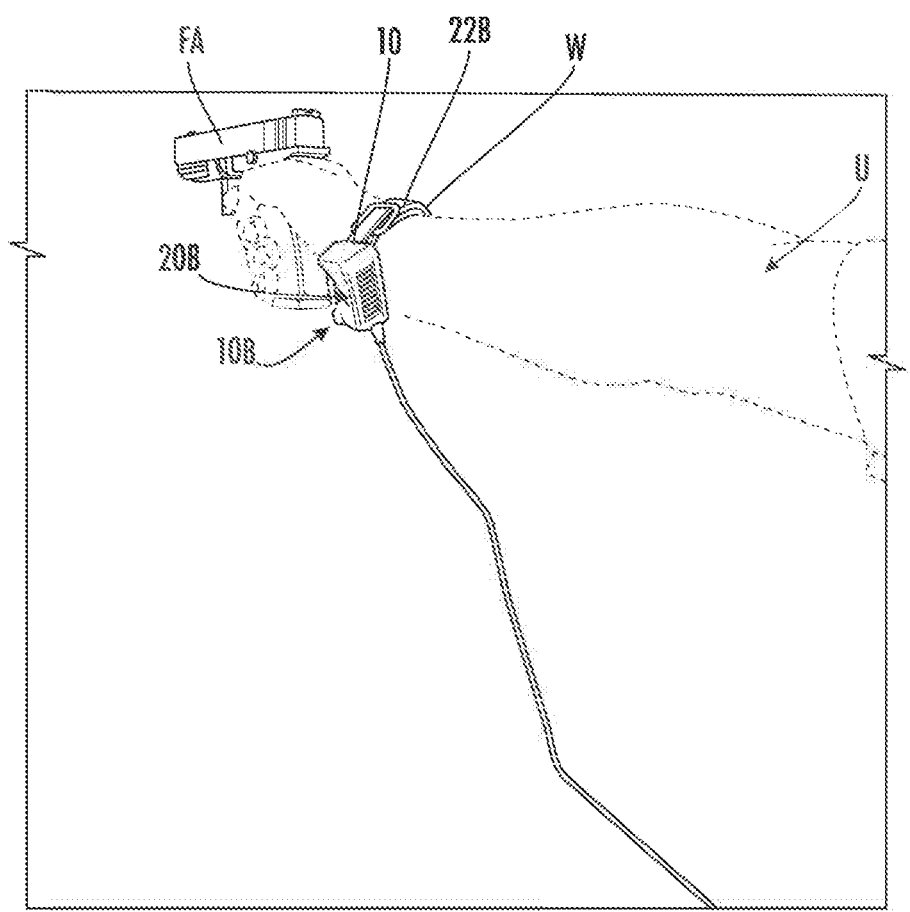

Referring to FIGS. 2A-2C, another embodiment 10B of a gunshot accounting device 10 is provided. The gunshot accounting device 10B may include a housing 20B for containing and protecting components of the gunshot accounting device 10A therewithin. The housing 20B is configured to be worn on the wrist W of a user U, particularly, on the wrist W of the hand that the user U uses to hold the firearm FA. For example, the housing 20B can be secured to a wristband 22B, such that the housing 20B can reside on the inside portion of the wrist W of the user U. The wristband 22B an be adjustable to be sec able to different sized wrists. The gunshot accounting device 10B can also comprise a display 24B on one side or face of the housing 20B for displaying information to the user. The display 24B of the gunshot accounting device 10B can comprise round indicators 30B for displaying the number of rounds remaining in the user's firearm. In the embodiment shown, the round indicators 30B can, comprise individual indicators with a light emitting diode lighting up each indicator. The individual round indicators 30B of the display 24B of the gunshot accounting device 108 may be different colors (e.g., green, yellow, orange, red) to indicate that the number of rounds remaining is approaching zero, or to indicate some other information. For example, the gunshot accounting device 10B can be programmed to receive information about the number of rounds available in the clip and chamber of the firearm FA. If that number is greater than the number of round indicators 30B, then the gunshot accounting device 10B can keep track of the rounds fired and begin to show the firing of rounds on the display once the number of rounds left available in the firearm FA is equivalent to the number of round indicators 30B on the display 24B. From there onward with each firing of a round that is registered, the green round indicators 30B begin to count down with an individual round indicator turning off as a firing of a round is registered. As shown in FIG. 2B, the last three round indicators 30B can be a different color, such as ed, to indicate that the number of rounds left in the firearms FA is approaching zero.

Figure 3A:
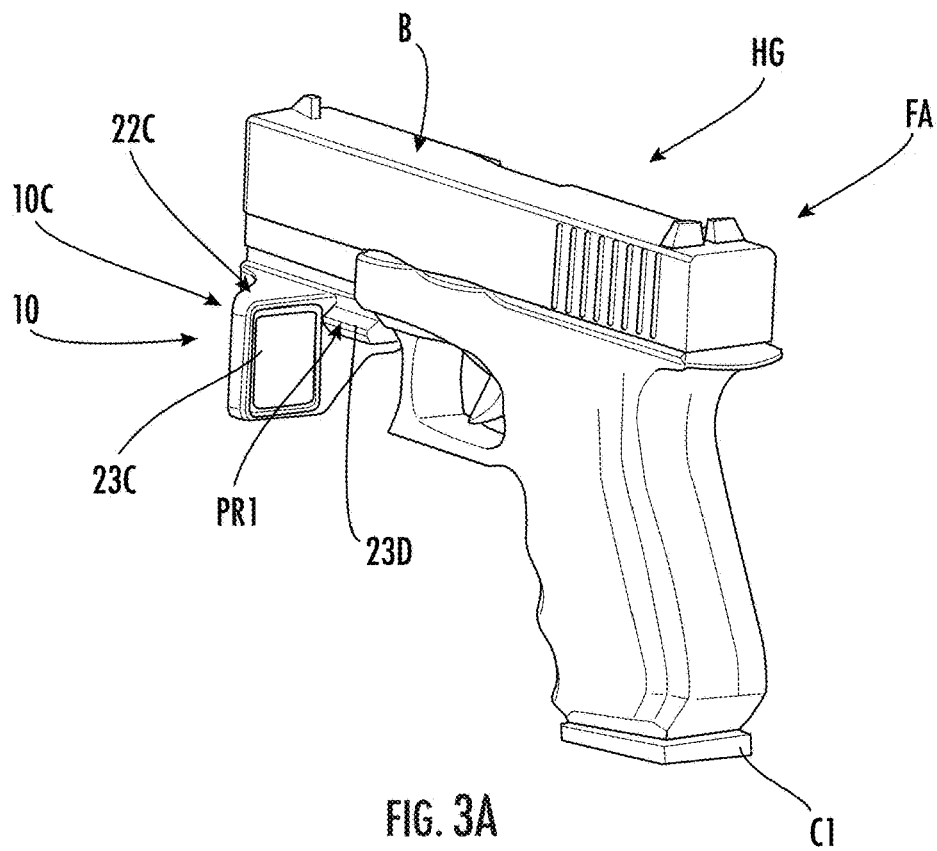
FIG. 3A depicts a rear perspective vie a handgun with an embodiment of a gunshot accounting device in use on a picatinny rail of the handgun according to the presently disclosed subject matter.
Figure 3B:
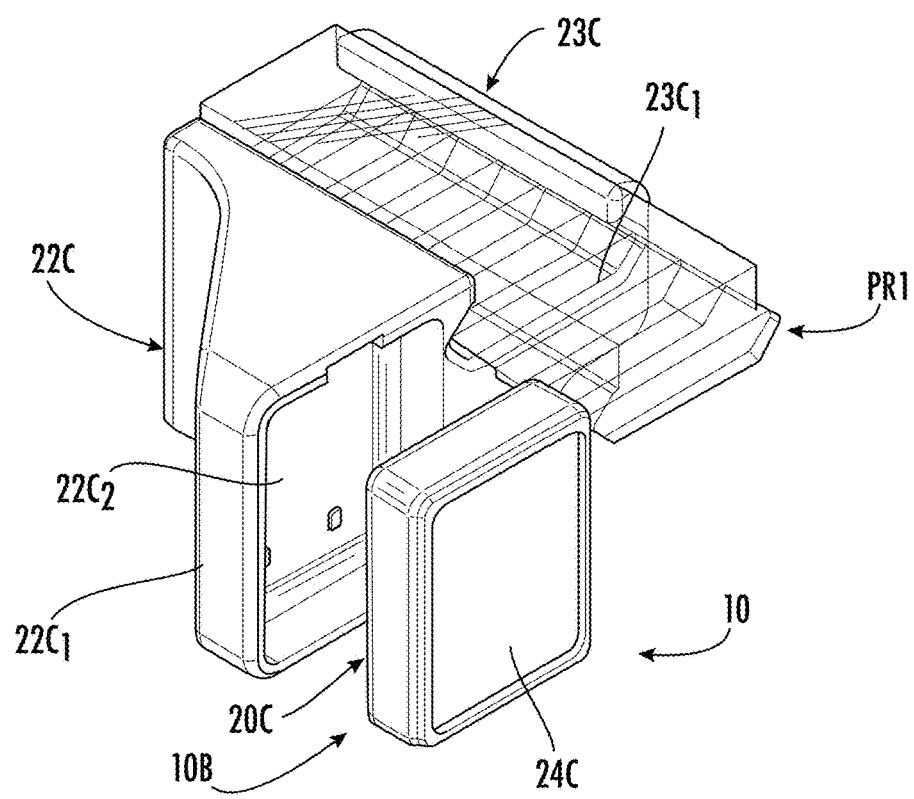
FIG. 3B depicts an exploded perspective view of the embodiment of the gunshot accounting device according to FIG. 3A that is securable to a picatinny rail of a handgun.
Figure 4A:
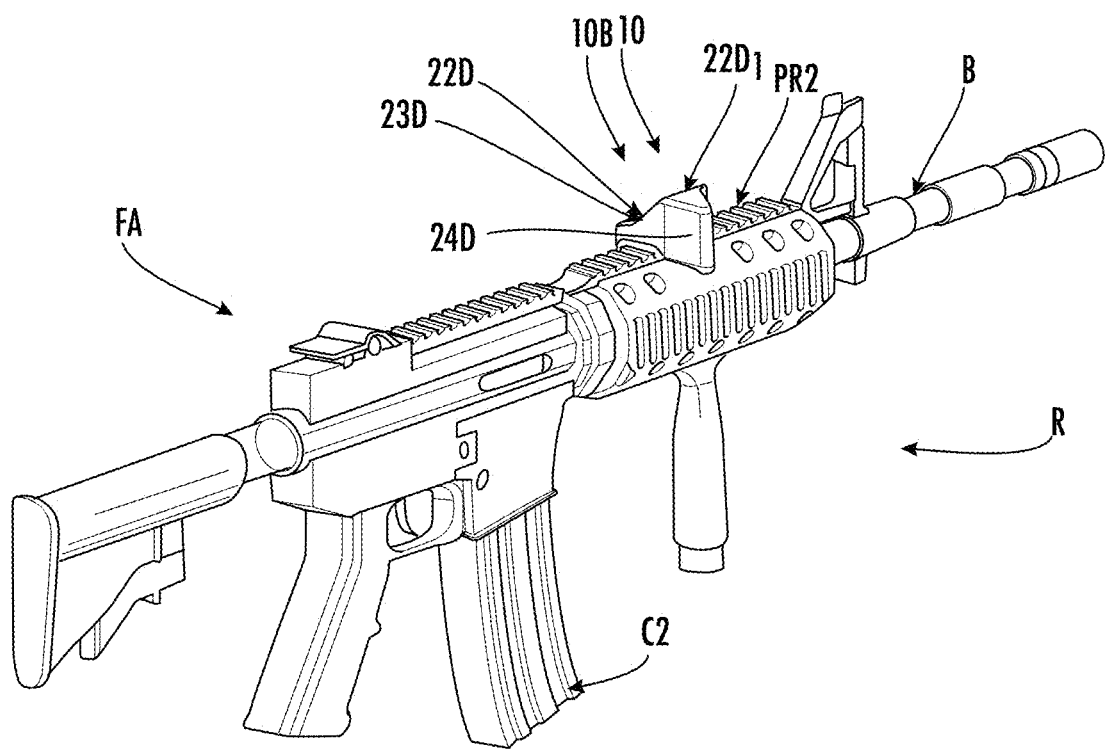
FIGS. 4A and 4B depict a rear perspective view and a side elevation view of a rifle with an embodiment of a gunshot accounting device secured to a picatinny rail of the rifle according to the presently disclosed subject matter.
Figure 4B:
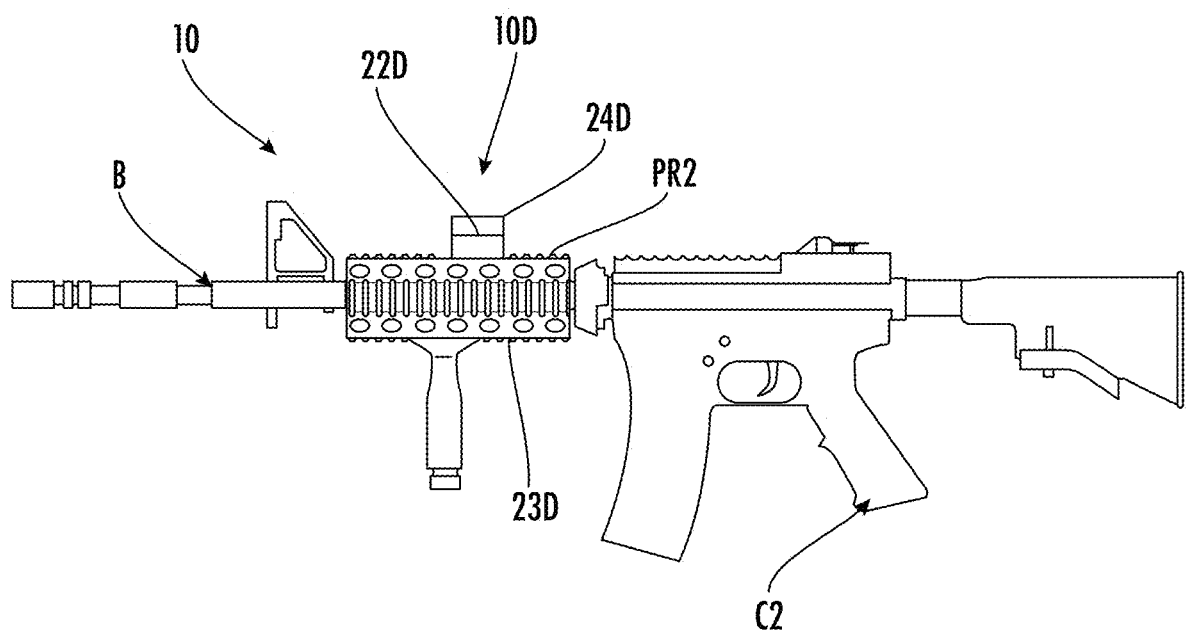

FIGS. 3A-3B and 4A-4B illustrate other embodiments of a gunshot accounting device 10 that can be secured to picatinny'rails of, a firearm FA. Referring to FIGS. 3A and 3B, the firearm FA is a handgun HG with a clip C1 for holding rounds therein and on which a picatinny rail PR1 is secured beneath a barrel B of the handgun HG. An embodiment 10C of a gunshot accounting device 10 is secured to the handgun HG by an attachment device 22C. The attachment device 22C can be a casing $22C_1$ that holds the gunshot accounting device 10C therein so that the user holding the handgun HG can view a display 24C of the gunshot accounting device 10C. Similarly, as shown in FIGS. 4A and 4B, the firearm FA can be a rifle R that on which a picatinny rail PR2 is secured around a barrel B of the rifle R. A gunshot accounting device 100 can be secured to the rifle R by attachment to the picatinny rail PR2. In particular, the gunshot accounting device 10D can comprise an attachment device 22D that firmly holds the gunshot accounting device 100 to the rifle R and a display 24D for displaying some manner of a count of rounds available in the rifle R and/or clip C2 for firing. The attachment device 22C can hold the gunshot accounting device 10D therein so that the user holding the rifle R can view a display 24D of the gunshot accounting device 10D.

As with the embodiments described above, the gunshot accounting devices 10C, 10D may each comprise respectively a housing 20C, 20D for containing and protecting components of the respective gunshot accounting device 10C, 10D therewithin and a fastener or attachment device 22C, 22D for attaching the gunshot accounting device 10A to the firearm FA, such as the handgun HG or the rifle R. Each of the attachment devices 22C, 22D can comprise a casing 22C$_1$ and 22D$_1$ in which the respective housing 20C, 20D securely fits. Each of the casings 22C$_1$ and 22D$_1$ of the attachment devices 22C, 22D can also comprise an engagement aim 23C, 23D that firmly hold the attachment devices 22C, 22D such that the gunshot accounting devices 10C, 10D can, be held stationary relative to the respective handgun HG or rifle R so that the gunshot accounting devices 10C, 10D moves as the respective handgun HG er rifle R moves. For example, in some embodiments as shown on FIG. 3B the engagement arm 23C may have an engagement channel 23C$_1$ that engage the picatinny rail PR1 to hold the attachment device 22C and gunshot accounting devices 10C therein to the handgun HG. In some embodiments, the attachment devices 22C, 22D can include a battery therein that can provide extra power to the respective gunshot accounting devices 10C, 10D. For example, as shown in FIG. 3B, a charging port 22C$_2$ that can be provided in the casing 22C can engage a charging port of the gunshot accounting device 10C to provide extra power.

The gunshot accounting devices 10C, 10D can also comprise displays 24C, 24D on one side or face of the respective housings 20C, 20D for displaying information to the user. Each of the displays 24C, 24D may include a firearm indicator for indicating the firearm currently being used by the user and a battery indicator for displaying the amount of battery charge left in the respective gunshot accounting devices 10C, 10D. Further, the displays 24C, 24D of the gunshot accounting devices 10C, 10D can each comprise a rounds indicator for displaying the number of rounds remaining in the user's firearm similar to the rounds indicator shown in the display 24A of the gunshot accounting device 10A shown in FIG. 1A. The displays 24C, 24D of the gunshot accounting devices 10C, 10D may also comprise other indicators for displaying other information as described above.

To operate the gunshot accounting devices 10 as shown in FIG. 1B-4B, the respective housings 20 of gunshot accounting devices 10 can house and protect different components used to collect, analyze, and/or communicate data related to the identifying and counting of fired rounds from a firearms can be seen in FIG. 1B. For example, the gunshot accounting devices 10 can comprise a circuit board 32, such as a printed circuit board that can be used to operate and connect a number of components. For example, the housings 20 may house a number of components, such as one or more sensors 34, including but not limited to one or more of the following: accelerometer 36 for sensing motion or acceleration (e.g., a piezoelectric accelerometer), one or more microphones 38 for sensing audio, a pressure sensor or piezoelectric crystals for sensing pressure, a location sensor (which may be a GPS receiver), or any other sensor configured to detect a condition of the environment in which the user is located or a condition that indicates the firing of a round from a firearm by the user. The accelerometer 36 can be, for example, an inertial measurement unit (IMU) accelerometer that includes one or more accelerometers, one or more gyroscopes, and one or more magnetometers. Each of the gunshot accounting devices 10 can comprise a computing module 40 that can comprise a processor 42 and a memory 44. Further, the gunshot accounting devices 10 can comprise a battery, a regulator, and a charger. The processor 42 can comprise for example, a M4 ARM processor, such as an M4F ARM processor manufactured to the design specifications provided by ARM holdings, Inc. The computing device 40 can include firmware and/or software, that can be used to operate the one or more sensors 34. For example, the computing device 40 can be used to turn on and setup the IMU accelerometer, capture the IMU accelerometer data for training a neural network and artificial intelligence, and identify and extract feature data that can be used in identifying if a round has been fired, from the user's firearm.

The gunshot accounting devices 10 may be in wireless electronic communication with one or more computing devices, which can include, but is not limited to a smartphone, a tablet computer, or other mobile smart device that is in the possession of the user or some other remote computing device as explained further below. These computing devices may expand the capabilities of the gunshot accounting devices 10 by housing and utilizing additional memory, processors, computing or battery power, software, neural network or artificial intelligence and/or other hardware or software functionalities. These one or more other computing devices in combination with the gunshot accounting, device(s) 10 can comprise a gunshot counter system that can be used to monitor one or more users and the gunshots fired from the firearms of each user. For example, the data collected can be used to determine when and where rounds of ammunition were fired providing exact or near exact times and locations of such round firings. This information may be useful in military and law enforcement operations as well as everyday encounters of law enforcement to identify when and where shots were fired for both training purposes and for any necessary recounting of facts. Additionally, the information can be used to pinpoint where back-up is needed in a shooting situation in real time and/or recorded and archived for future investigation processes or for the application of system enhancement/enrichment future system iterations.

Each of the housings 20 may further house a battery for powering the respective displays 24, sensor(s), computing module, memory and/or processors. The battery may be rechargeable and may he charged wirelessly, or by using an electrical connection. Each of the housings 20 may include one or more connection pins (or ports) for charging the battery and/or permitting data transfers through an electrical connection, such as software updates or installations, as well as transfer of data and analytics for further analysis. The port may be a Universal Serial Bus (USB) port, such as USB-C. The pin(s) or port(s) may be in electrical communication with the battery. In some embodiments, the battery may include a coil for receiving a wireless energy transfer.

The computing module 40 of any gunshot accounting device 10 or computing device of the gunshot counter system may include a processor 40 and/or memory 44 for storing and/or analyzing the sensed data or the received data. For example, the IMU accelerometer 36 can capture movement data of the hand/arm of the user firing the firearm which provides a motion fingerprint of the gunshot and recoil, which may be stored within the memory 44 and analyzed by software and logic of the processor 42 to determine if motion fingerprint indicates a gunshot from the user's firearm. Similarly, the microphone 38 may capture audio waves as sensed data, which may be stored within the memory 44 and analyzed by software and logic of the processor 42 to determine if such audio waves indicate a gunshot from the user's firearm. The processor 42 may also be configured with software to transmit sensed data or analytics from the gunshot accounting device 10. The gunshot accounting device 10 may transmit the sensed data or analytics through the wired communications, such as pins, port(s) electronically, or through a wireless transmitter 46 to a wireless receiver of a remote computing device for further processing, analyzing, and/or storage operated by a third party or by the operators of the gunshot counter system. The device may include, an internal subscriber identity module or subscriber identification module (SIM). The sensed data or analytics may be processed to perform analytics, develop metrics and statistics, enabling predictive insights. For example, specific features of the movement data that form a motion finger print of a gunshot and recoil can be extracted. These extracted features can be analyzed by the artificial intelligence to train the artificial intelligence to recognize the motion fingerprint of the firearm being fired by the user in real time as will be explained in more detail below.

Figure 5A:
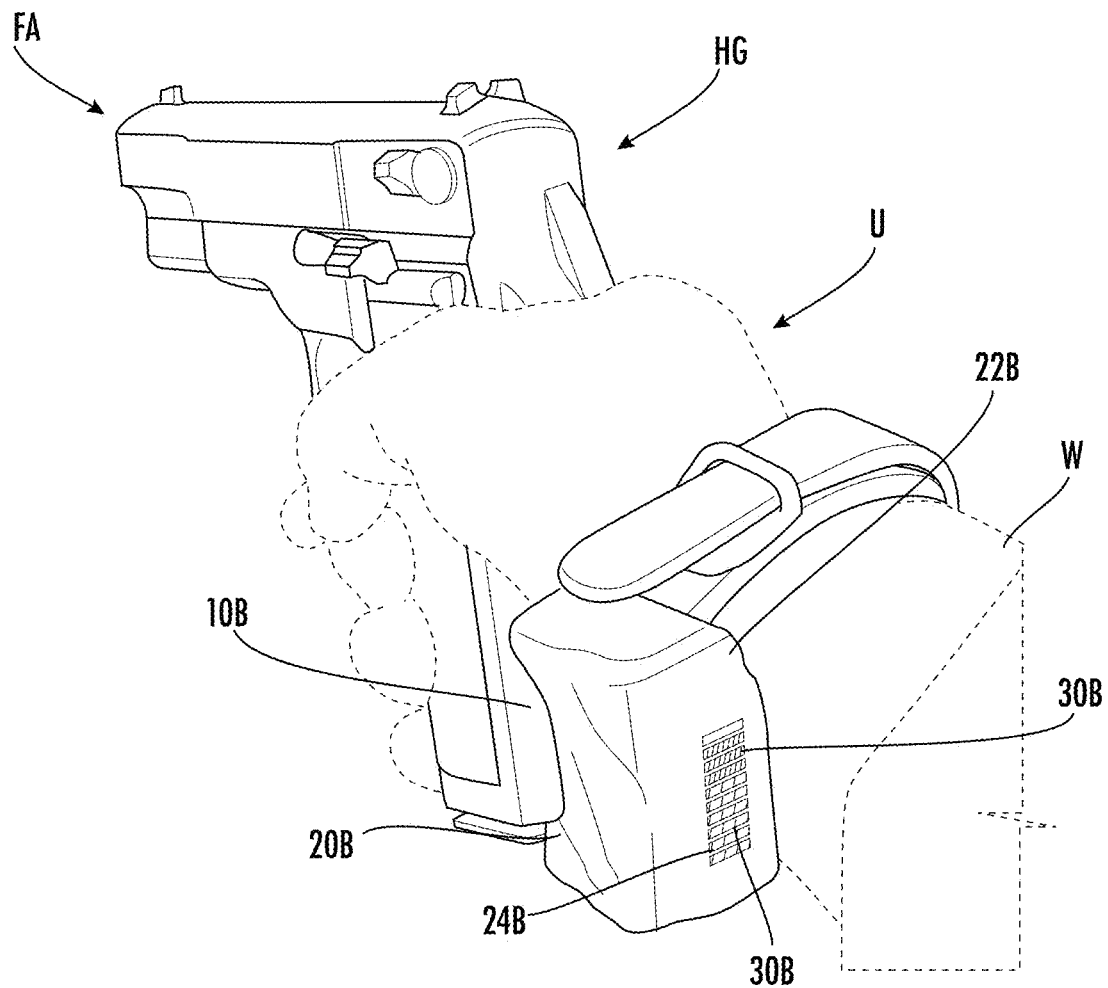
FIG. 5A depicts a rear perspective view of a user holding a handgun arid an embodiment of a wearable gunshot accounting device secured to the wrist of the user before any rounds have been fired from the handgun with the gunshot accounting device displaying indicators representative of the number of rounds remaining according to the presently disclosed subject matter.

For example, as shown in FIGS. 5A-5D, an embodiment of a gunshot accounting device 10B is shown in use on a wrist W of a user U that is firing a firearm FA, such as a handgun HG, to count the rounds left. The display 24B has round indicators 30B for displaying the number of rounds remaining, in the users firearm with the round indicators 30B each having a light emitting diode that can light up the corresponding indicator. In FIG. 5A, the user U is aiming the handgun HG and the round indicators 30B on the display 24B of the gunshot accounting device 10B on the wrist W of the user U shows the handgun HG has at least nine (9) rounds available in the clip and/or chamber for firing.

Generally, the following steps are involved in the firing of a firearm FA. After the rounds (i.e., cartridge) are loaded in the firearm FA, which usually includes loading the rounds 3 into a magazine or clip of the firearm FA. A single round is then loaded into the firing chamber of the barrel of the firearm through one of any number of methods, such as by translating a slide of the firearm FA back and forth. When a trigger is pulled, the hammer is cocked and released and strikes a firing pin, which in turn strikes a primer of the round in the chamber. When the primer is struck, a chemical reaction occurs, igniting the propellant housed within the casing of the round. The propellant burns rapidly, creating increasing pressure within the round, until the bullet of the round is propelled forward, and the spent casing is ejected in the reverse direction. In some firearm designs, the next round is auto-loaded as the slide translates during the firing of the round. In other firearm designs, the next round 3 must be manually loaded. After the bullet exits the barrel, a muzzle blast follows, which includes the gases and unburnt propellant. Depending upon the ammunition characteristics, the bullet may be accelerated beyond the speed of sound in air thus breaking the sound barrier. The force generated by this firing process, causes the firearm and the hand and arm holding the firearm to move in a variety of directions. While the experience and strength of the user of the firearm as well as the caliber of the round and the amount of propellant within the round may cause the movement of the hand, wrist, and arm of the user to vary, such movement generally always occurs.

Figure 5B:
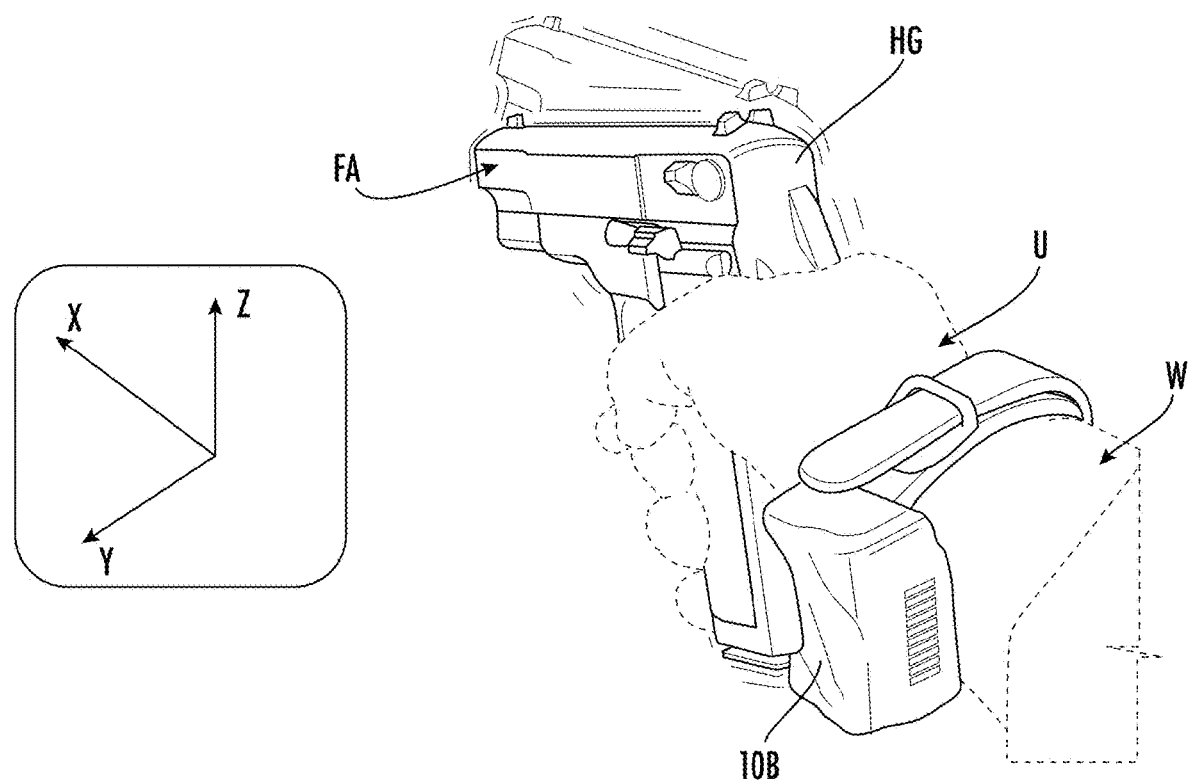
FIG. 5B depicts a rear perspective view of the user according to FIG. 5A firing a round from the handgun.

FIG. 5B shows the user U firing the handgun HG causing the handgun HG as well as the hand and wrist W of the user U to instantaneously move in a variety of directions relative to the coordinates X, Y, Z which are measured by the gunshot accounting device 10B. For example, in some embodiments, the gunshot accounting device 10B using the computing module and the IMU accelerometer therein the IMU accelerometer including one or more accelerometers, one or more gyroscopes, and one or more magnetometers can measure these movements based on a coordinate system, such as an X, Y, Z coordinate system, the orientation of which being assigned by the IMU accelerometer and/or the computing module of the gunshot accounting device 10B. The IMU accelerometer can capture data about the various movements of the wrist W of the user U upon the firing of the handgun HG. The computing nodule of the gunshot accounting device 10B can store the measurement data and can extract feature data from the measure rent data using a filter program that can be used to create a motion fingerprint of the firing of the handgun HG to identify whether a round has been fired from the handgun HG. For example, the computing module can be in wireless communication a remote computing device. The computing module of the gunshot accounting device 10B and/or the one or ore remote computing devices can include artificial intelligence deep learning software and/or firmware and/or machine learning that can include a neural network, hereinafter the "AI system." In some embodiments the computing module of the gunshot accounting device 10E; can live stream the measurement data from the IMU accelerometer.

Due to the difference in the experience arid ability of the different users and the difference in recoil of different handguns caused by the firing of the respective handguns, the AI system can be trained by a user firing a set number of rounds from a respective handgun so that the measurement data is collected, and the features extracted, that are analyzed by the AI system process to train the AI system to recognize the motion fingerprint in real time of the firing of the handgun through repetitive actions HG. Once the AI system is trained to recognize the firing of the handgun HG, it can be used to determine how many rounds are available in the handgun HG in real time.

Figure 5D:
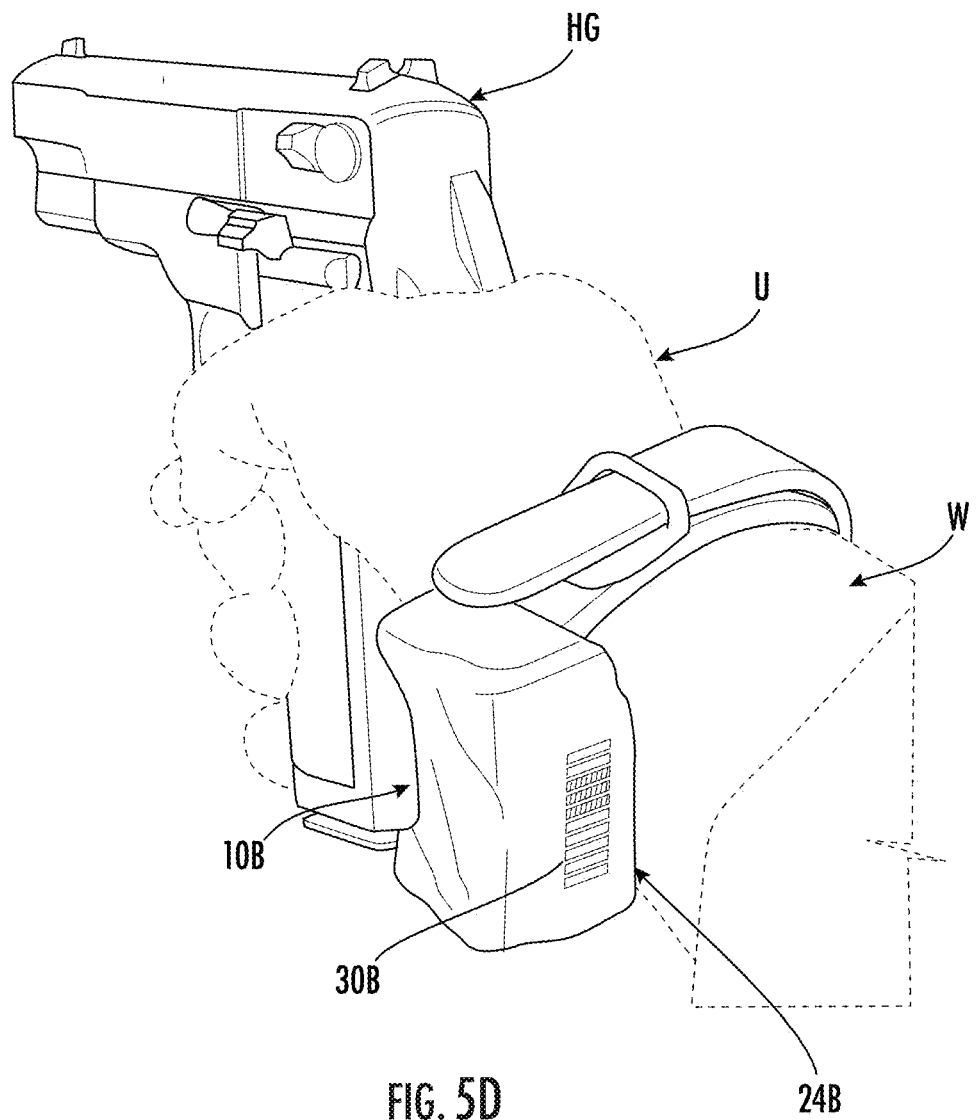
FIG. 5D depicts a rear perspective view of the user holding the handgun according to FIG. 5A with the embodiment of the wearable gunshot accounting device displaying indicators representative of the number of rounds remaining when the rounds remaining are low to warn the user it is approaching time to reload according to the presently disclosed subject matter.

FIG. 5C shows the user U holding the handgun HG after the firing of a round from the handgun as shown in FIG. 5. The display 24B of the gunshot accounting device 10B on the wrist W of the user U now shows the handgun HG has eight (8) rounds available in the clip and/or chamber of the handgun HG for firing. As rounds from the handgun HG are continued to be fired by the user U, a corresponding light of a round indicator is turned off showing one less round is available within the handgun HG for firing As shown in FIG. 5D, the round indicators 30B representing the last few rounds can be a different color from the other round indicators 30B to signify to the user U that the handgun HG is close to being empty of available rounds and will soon need to be reloaded, for example, by removing an old clip CP from the handgun HG and inserting a new clip.

Referring to FIGS. 6A-6C and FIG. 7, graphical representations of examples of motion fingerprints from the extract features that can be analyzed by the AI system processing to determine if a round was fired by a firearm are provided. In some embodiments, the graphical representations can represent movement in at least one of six different measurements including the X-direction, the V-direction, the Z-direction, the roll (the rotation about an X-axis), the pitch (the rotation about a Y-axis), and the yaw (the rotation about a Z-axis) relative to time. In some embodiments, the data points that comprise the extracted features can be plotted or a coordinated system. For example, in some embodiments, the data points that comprise the extracted features can be plotted on coordinated system can be two-dimensional. In particular, in some embodiments, the AI system can analyze the amplitudes of the movements in the various directions, including rotational movements, within a short window of time to determine if a round has been fired from the handgun HG. The measurement data can be sampled, (for example, about 119 times per second) and filtered through the AI system and run through the samples for the identification and extra ton of desired features. The AI can use statistical analysis, such as median, standard deviations, anomalies, etc. and can also use macros like direction, relative motion, etc., during the extraction process. When the handgun HG is fired, the measure rent data that is generated by the gunshot accounting device 10B secured to the wrist W of the user U is analyzed by the AI, for example, through live streaming, to extract features to generate the information in the form of the graph, or motion fingerprint shown in FIG. 6A, for example, that represents a firing of the handgun HG.

Figure 6A:
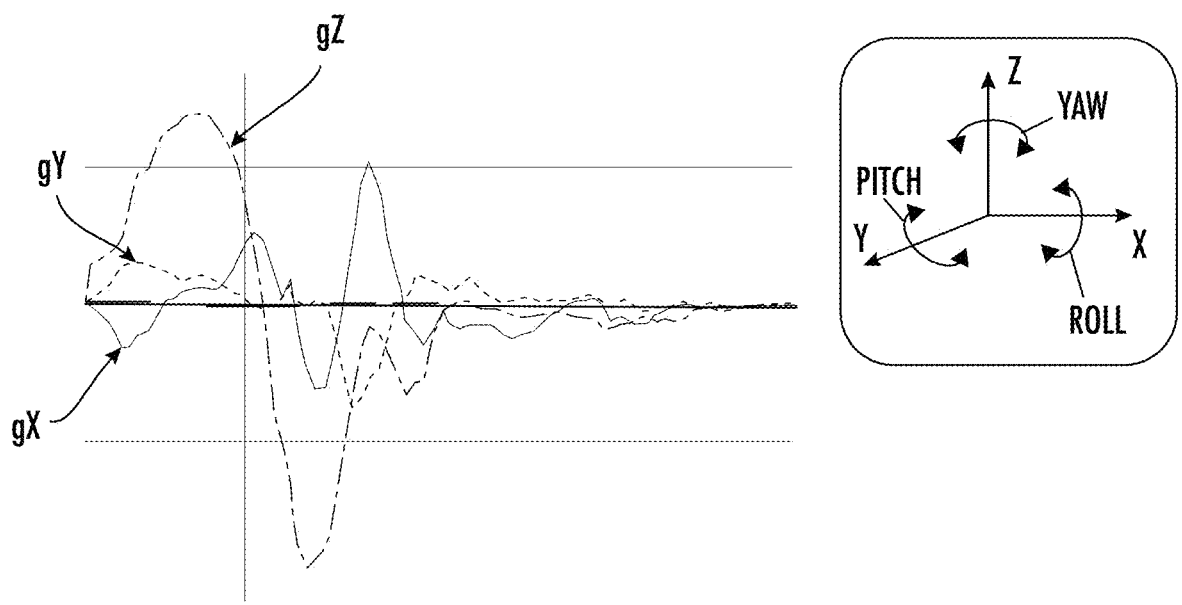
FIG. 6A depicts a schematic graphical representation of extracted movement measurements taken by an embodiment of a gunshot accounting device during a firing of a handgun, the measurements being used to indicate the firing of a round from the handgun according to the presently disclosed subject matter.
Figure 6B:
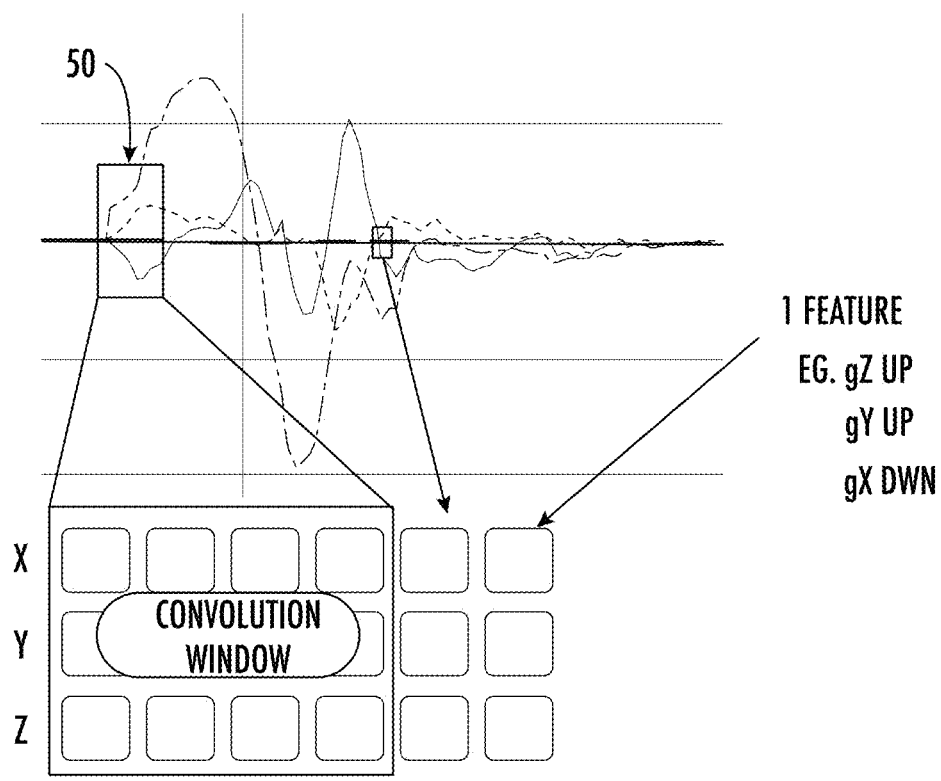
FIGS. 6B and 6C depict schematic graphical representations of analysis processes used to analyze the movement measurements to determine if the firing f a round from the handgun has occurred according to the presently disclosed subject matter.
Figure 6C:
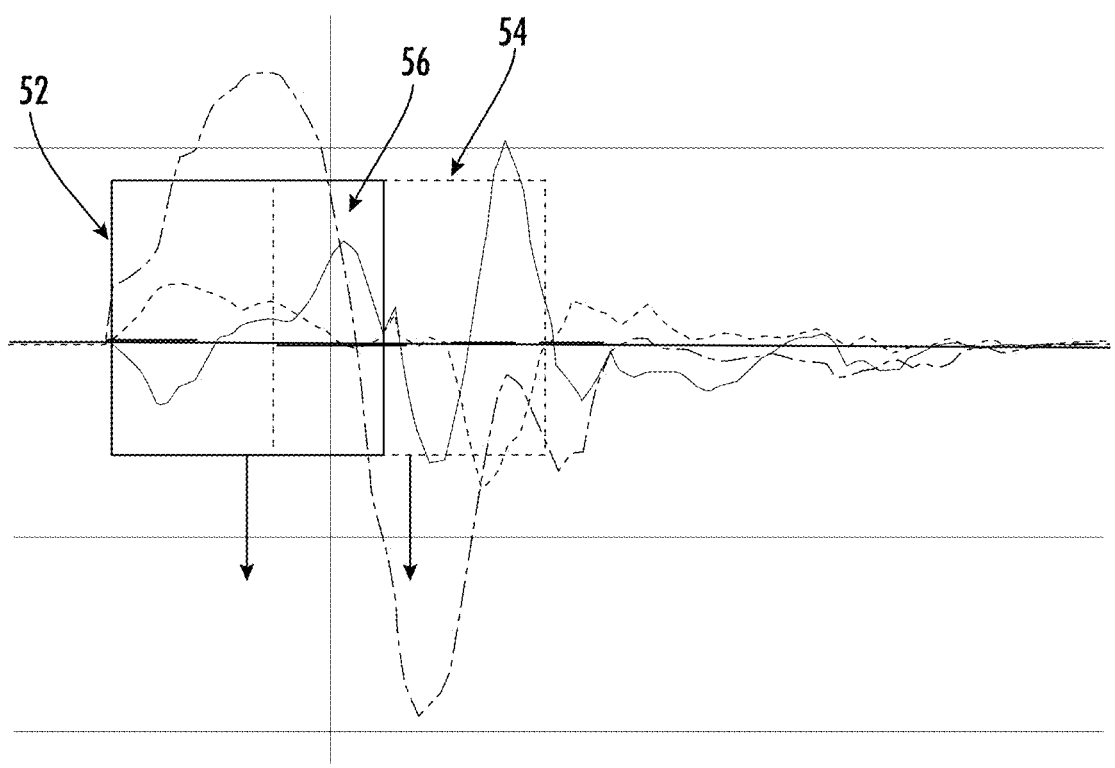

Referring to FIG. 6B, in some embodiments, to determine if the set of extract features represents a firing of the handgun HG, a detection window 50, which represents a window of time, can be used to analyze the continuous streaming data of the extract features graphically represented, for example in FIG. 6B in real time. particular, in some embodiments, a convolutional neural network (CNN) sliding window can be used to run on this streaming data to process the data within this window. Such CNNs can be good for high density connection work images, such as the graph images shown in FIGS. 6A-7, videos, etc. Using the detection window 50 in the CNN can ensure predictability but with order and sequence being a priority to make the recognition of a firing of a round from a firearm easier. For example, the detection window 50 in the CNN can be used to recognize markers, or telling data points or combinations of data points, within the extracted features.

For example, as the measurement feature gZ goes up, while the measurement feature gY goes up and the measurement feature gX goes down within a detection window 50 of a short amount of time, then the AI use this data to predict a likely firing of the handgun which can be confirmed with later detection window analysis of the rest of graphic representation of the measurement data based on the predictable order and sequence of data. A gunshot and recoil motion can take about 0.5 seconds or longer. In some embodiments, the detection window 50 can be about 8 milliseconds (ms) window of time. In some embodiments, the detection window 50 can be about 0.5 seconds (s) window of time. So, multiple windows can be used to track and determine if a shot was fired from a firearm. So, interconnections and correlations of movement between all translational and rotational axes an be important and can be used to predict that a firing of a round from the firearm has occurred.

Additionally in some embodiments, to increase accuracy, the CNN can operate the detection windows as double windows. For example, two of these windows 52, 54 and processes are running in parallel to each other, with a small overlapping gap 56. This use of two overlapping detection windows 52, 54 ensures a complete detection of a gunshot from shot to recoil. Using the double detection windows 52, 54 with the overlapping gap 56 helps reduce the opportunity for over counting gunshots. Additionally, using double detection windows 52, 54 in the AI system can increase the speed of the AI system's process and its responsiveness while still permitting the AI to see an entire overview of the movement data at the same time.

Figure 7:
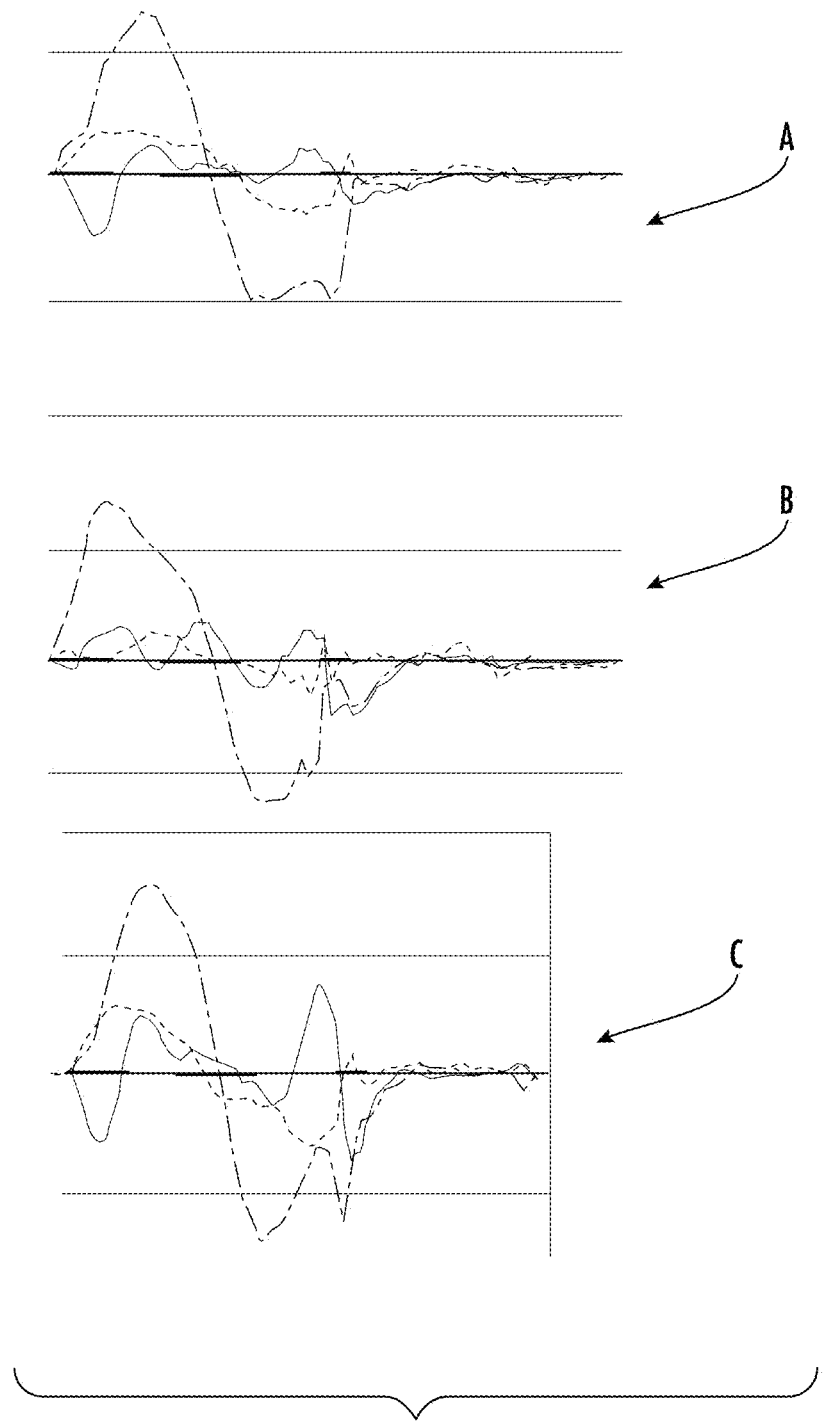
FIG. 7 depicts schematic graphical representations of extracted movement measurements taken by an embodiment of a gunshot accounting device during multiple firings of a handgun according to the presently disclosed subject matter.

Referring to FIG. 7, examples of graphical images A, B, C that represent different individual gunshots fired are provided. As shown, the measurement data that can be captured by the gunshot accounting devices 10 can vary depending on the type, make and model of firearm used, the type, and make of the rounds fired, the position of the gunshot accounting device 10 relative to the firearm FA, the experience and strength and shooting mechanics of the user U, etc. Additionally, even when the user and firearm type is kept constant, there can be variations between the firing of different rounds under various potential environmental conditions (such as altitude and/or temperature) or situational firearm variations (such as orientation/position) and/or geographic locations that may involve different scenarios (such as a flat field versus mountainous terrain versus a city location with tall, vertical buildings and/or structures present). Thus, in some embodiments, the AI system that is used can be trained to identify when a firing of a round has occurred for a user and/or type of firearm being used. Once the AI system has been 'trained', the accuracy of the recognition of the firing of a round can greatly increase. Thus, due to these unique signatures, the method of using the gunshot accounting devices 10 may include performing training trials so that the respective gunshot accounting devices 10 may store and analyze the measurement data by the sensors 34 to determine unique signature data for each firearm and/or round. The software of the system may capture the firearm type, the round type, the user profile, and any other information that the user may provide to the gunshot counter system. Additionally, the gunshot counter system may detect or retrieve from third party systems (e.g., time. date, environmental and weather conditions, etc.). The system 10 may display training instructions to the user to ensure the training data is consistently collected and has maximized fidelity. For example, the user may be instructed to use the firearm a first time to best capture representative measurement data from the sensors. Further, the user may be instructed on how to appropriately fasten and position the gunshot accounting device 10 being used so that the fidelity of the data collection is consistent and maximized. The position of the d gunshot accounting device 10 may vary according to firearm, user and/or round type. The timing of round, firings may also be instructed, so that ample time is provided between firings, thereby minimizing interference between firings during the training of the AI system.

During a training session, the entire magazine may be discharged in sequence and all data collected by the system. Once the data is collected, such data may be analyzed to determine unique signature data. A subsequent training, with a newly loaded magazine, may be performed to verify the accuracy of the unique signature data, test its efficacy, or amend. Additional training may be determined by the gunshot counter system and the gunshot accounting device 10 to be useful for adjusting and refining the unique signature data. In some training sessions, a subsequent training session may be performed amongst varying environmental and weather conditions to ensure the signature data is accurate and effective. The gunshot counter system and the gunshot accounting devices 10 utilizes the AI system's algorithms, or other data analysis techniques so that the data collected from any number of users may be used to enhance the gunshot detection accuracy of the gunshot counter system and the gunshot accounting devices 10. The training session(s) by the user may aid the system in identifying each step of the firing process, the timing between each step, and permit the system to make hardware and/or software adjustments to ensure accurate information is captured.

To provide a check system to confirm the firing of a firearm, other sensors 34 can detect the firing of a firearm in other ways with the data used to match time and/or location data to further verify that a round has been fired from the firearm by the user. For example, the one or more microphones 38 can be used detect and measure sound, or audio, data to recognize the soundwaves produced from the firing of the gun. In some embodiments, the one or more microphones 38 can be used to measure and collect sound data in a manner similar to the methods and system disclosed in U.S. Provisional Patent Application Ser. No. 63/113,630, filed Nov. 13, 2020, which, as outlined above is incorporated herein in its entirety. As above, the sound data can be graphed and analyzed using an AI system that employs one or more neural networks. There are several key data points that may be sensed or determined during the firing of a firearm. The loading (or reloading) of the round, the release of the hammer and the firing pm striking the primer of the round, the ejection of the bullet and recoil associated with the spent cartridge, and the reloading of the round. Each of these steps may have unique sound, timing, movement, and pressure signatures, depend on the firearm type and modifications (such as a suppressor, or stock or muzzle modifications), rate muzzle velocity, the particular type of round, variance between the same types of rounds, variance between the round position within the magazine and/or firearm, and variations in how the user operates the firearm. The gunshot counter system and the gunshot accounting devices 10 may include more than one recording channel: one with sufficient gain to detect the subtle mechanical sounds, and the other only to detect the loud muzzle blast sounds.

In some embodiments, one or more microphones 38 (see FIG. 1B) are included in the gunshot accounting devices 10 can be used for capturing audio waves of the firing of the round. Though a single microphone 38 may suffice, two (or more) microphones 38 may be used so that each is configured to best sense a particular sound wave from the firing process. For example, one microphone 38 may be configured for sensing the bullet ejection (a much louder and stronger sound wave). Various hardware and software features may be included in the system to maximize the fidelity of the data being captured by the microphones, for protecting the microphones from damage, and/or for minimizing the amount of noise and other data being collected by the system (which may be useful if memory or battery life is constrained). According to some embodiments, sound wave signal data above or below a certain threshold may be ignored. For example if, during the training sessions or through other analysis, it is determined that the bullet ejection has at least an amplitude of X, then any sound waves with amplitudes less than X (or a percentage of X, like 90%) could be filtered out or ignored by software (likely being reflections or other gunshots or noises). A reflection's amplitude is smaller, even when directly reflecting off the ground underneath the user—the pressure drops at about 1/distance because some of the sound wave is absorbed and diffracted.

Figure 8:
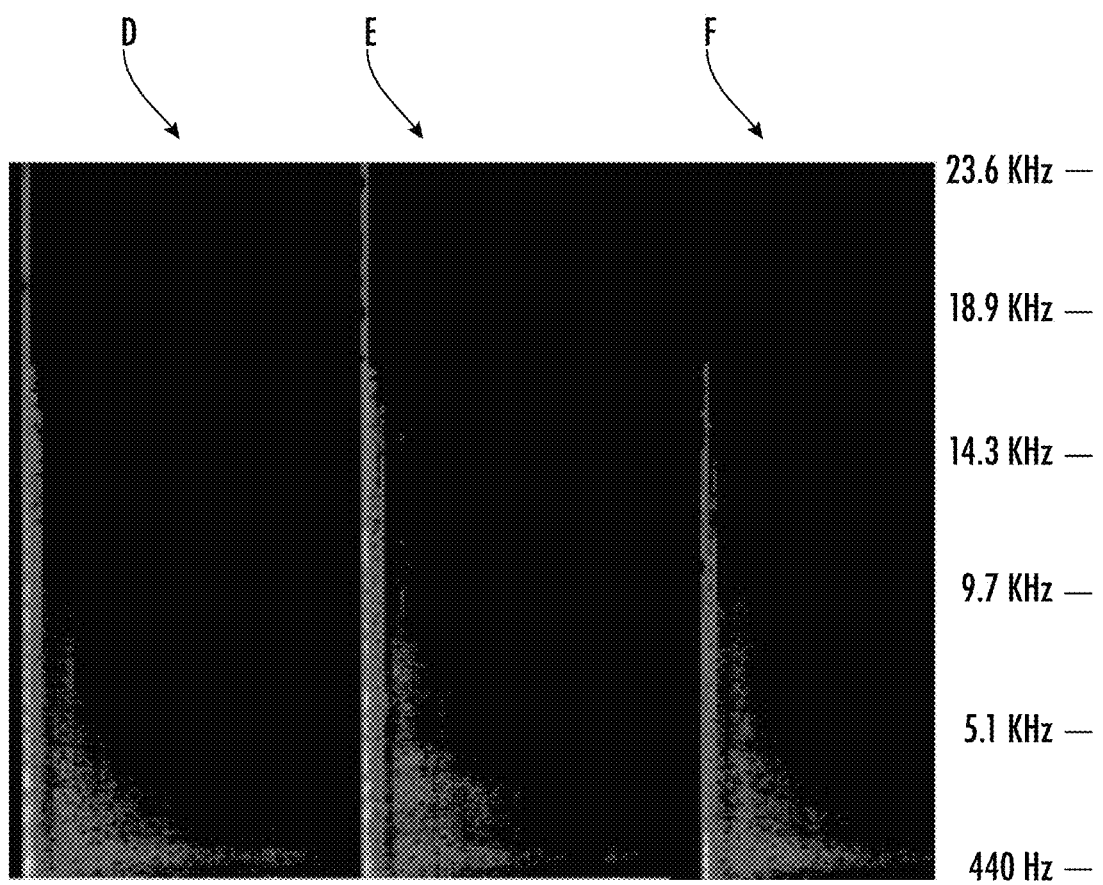
FIG. 8 depicts sound waveform measurements of rounds being fired from different firearms as measured by a gunshot accounting device according to one or more embodiment of the presently disclosed subject matter.

In practice, the sound wave measurement data captured by the microphones) 38 can be analyzed to extract feature data to provide a graphical representation of the firing of rounds as shown in FIG. 8. In some embodiments, the AI can use a CNN similar to the CNN described above to use one or more detection windows to analyze live streaming data represented in the time vs. sound wave amplitude graph similar to the graphs D, E, and F, show in FIG. 8. When the AI system used to analyze the amplitudes of the sound waves data identifies that a round has been fired the AI system can compare the timing of when the sound wave occurred with the analysis of the motion fingerprint and its corresponding timing to determine if the sound waves measurement analysis that a round has been fired matches with the motion fingerprint analysis that a gin gunshot has been fired based on time stamp and/or location data that has been collected by the gunshot accounting device being used.

As shown in FIG. 8 different types of firearms can produce different amplitudes of sound waves when a round is fired therefrom. For example, the time vs. sound wave amplitude graph of graph D shows the sound wave of a round fired by a Glock® handgun. The time vs. sound wave amplitude graph of graph E shows the sound wave of a round fired by a Berretta® handgun. Similarly, the time vs. sound wave amplitude graph of graph F shows the sound wave of a round fired by a Kimber® handgun. As can be seen, there are differences in the soundwave amplitudes between the three graphs D, E, F. For example, the sound wave generated by the Kimber® handgun generates a smaller sound wave than the Glock® handgun or the Berretta® handgun. Thus the training of the AI system for analysis sound measurement data can be more conducive for training prior to use in the field. Such differences can be taken into consideration by the AI system and can be enhanced over e or during training sessions for the AI system as described above.

Other sensors can be included as stated above that can be used to identify and/or confirm that a round has been fired. Such other sensors can include piezorestive sensors with the gunshot accounting device that can contact the user s forearm and or wrist. As the muscles of the forearm contract in order to squeeze the trigger, the piezorestive sensor located on inside of the wristband can report the muscle contraction in sequence with the actual gesture and can be used to sense the contraction of the muscle contractions used to resist the kickback caused by the forces from the firing of the firearm. Such measurements can be used to confirm data analysis by the AI on data from other sensors.

A general AI/algorithm can be employed by the gunshot accounting devices and systems, but permitting individual training ensures greater accuracy since each of these factors does change the specific gunshot signature, and training further permits some of the other features such as forensic reconstruction. During training, the gunshot accounting device can be connected directly to another computing device, such a laptop, during a "capture" mode due to the need to store and process a larger volume of data during the AI training. There is a baseline AI that can be used by the gunshot accounting devices and systems with a specific AI system process used on top of the basic AI system for specific sensor analysis. Both the basic AI system used to capture the data and the specific AI system process used to predict a firing of around can be firmware stored on the gunshot accounting devices.

Figure 9:
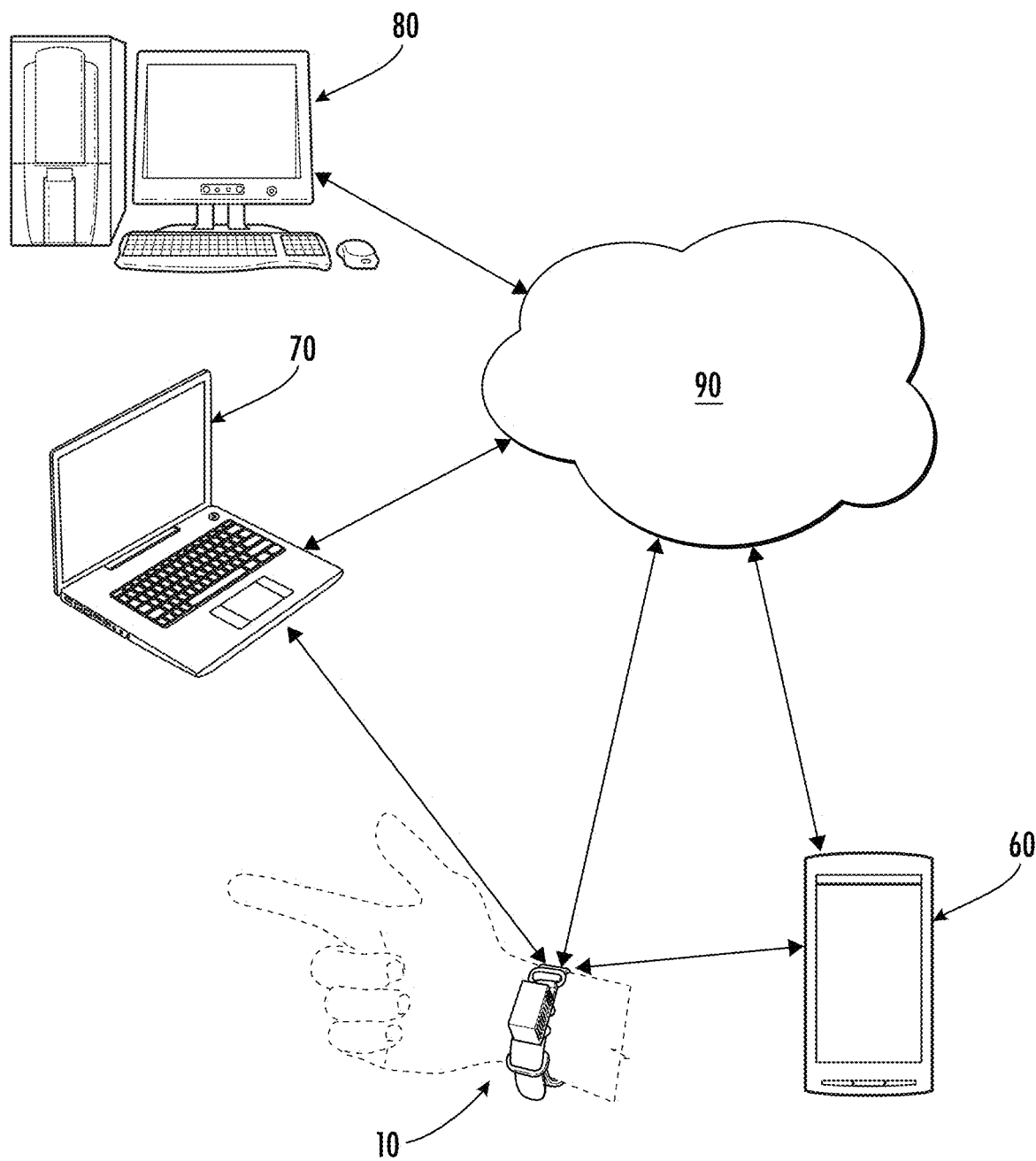
FIG. 9 depicts a schematic illustration of an embodiment of a gunshot accounting system according to the present subject matter.

Referring to FIG. 9, an embodiment of a gunshot accounting system GS as described above can be used to detect rounds fired and a determine the number of rounds still available in the firearm after each firing of a round. A gunshot accounting system GS can also be used to track, compile, and analyze additional information for counting and tracking rounds fired from a firearm or related to such activities that can be used in other analytics and can include btu is not limited to location data, time data, temperature and weather condition data, visibility data, or the like. For example, the gunshot accounting system GS one or more computing devices, such a smart mobile device 70, a laptop computer 70, and/or a remote computer 80, such as a smartphone, each of which can have a memory and a processor. The system GS can also include a gunshot accounting device 10 for counting and tracking rounds fired from a firearm. The gunshot accounting device can be in wireless communication or wired communication via one or more networks 90 with the smart mobile device 70, the laptop computer 70, and the remote computer 80.

The gunshot accounting device 10 comprising a housing that can, be secured to at least one of a user or a firearm used by the user and a display secured to the housing. Additionally, the gunshot accounting device 10 that can comprise at least one sensor residing in the housing 10 with the sensor being configured to collect sensor data. The gunshot accounting device 10 can comprise a memory for storing a filter and an artificial intelligence that can comprise a neural network and a processor residing in the housing and in communication with the at least one sensor and the display. The processor can execute the filter and the artificial intelligence stored within the memory to perform the steps of collecting sensor data from at least one sensor in the gunshot accounting device 10 used by a user and filtering the sensor data to extract extracted features from the sensor data using a filter program ed in a memory and executed by a processor within the gunshot accounting device. The processor of the gunshot accounting device 10 can also perform the step of analyzing the extracted features using an artificial intelligence with a neural network to determine if a round has been fired from a firearm held by a user using the gunshot accounting device based on the motion fingerprint. Further, the processor of the gunshot accounting device 10 can perform the step of displaying an indication that a round has been fired from the firearm held by the user on the display if the neural network determines that a round was fired based on the analysis of the extracted features. The gunshot accounting device 10 can share the data collected by the one or more sensors, the extracted features, or the analysis of the extracted features with the smart mobile device 70, the laptop computer 70, and the remote computer 80 for further compilation and analysis which can be used for training and other analytics.

The system GS may include any number of computing devices 60, 70, 80 and/or communications with third party systems to gather data and perform analytics for creating and/or identifying gunfire signatures. Sharing of sensed and analyzed data between users for situational awareness and team coordination may be enabled through wired or wireless communications between the system and third-party devices. Noise cancellation functions can be applied to the audio once captured or may be applied to the initial capture of sensed conditions through the microphone components itself. These computing devices 60, 70, and/or 80 may expand the capabilities of the gunshot accounting devices 10 by housing and utilizing additional memory, processors, computing or battery power, software, neural network, or artificial intelligence and/or other hardware or software functionalities. These one or more other computing devices 60, 70, and/or 80 in combination with the gunshot a counting device(s) 10 can comprise the gunshot counter system GS that can be used to r monitor one or more users and the gunshots fired from the firearm s of each user. For example, the data collected can be used to determine when and where rounds of ammunition were fired providing exact or near exact times and locations of such round firings. This information may be useful in military and law enforcement operations as well as everyday encounters of law enforcement to identify when and where shots were fired for both training purposes and for any necessary recounting of facts. Additionally, the information can be used to pinpoint where back-up is needed in a shooting situation in real time and/or recorded and archived for future investigation processes or for the application of system enhancement/enrichment future system iterations.

The gunshot counter system GS may include any number of wireless communication setups 46 through the network 90 to enable wireless transmission between a respective gunshot accounting device 10 and one or more other computing devices 60, 70, and/or 80, whether local or remote. The transmissions may be encrypted using any number of cryptographic or other encryption techniques, including but not limited to frequency hopping, time shifting, rotating key encryption and/or other private/public key encryption methods. For example, some encryption methods may only prevent decryption for very short periods of time, but such tine may be longer than is needed for the transmissions to be acted upon, and therefore the encryption is effective to prevent unwanted elements from reacting to such transmissions in real-time. Additionally, a user can connect the local devices, such as a mobile smart device 60 or a laptop 70, to the gunshot accounting device 10 through a wired connection or a wireless connection using a local network such as using Bluetooth connection or a WI-FI network.

Figure 10:
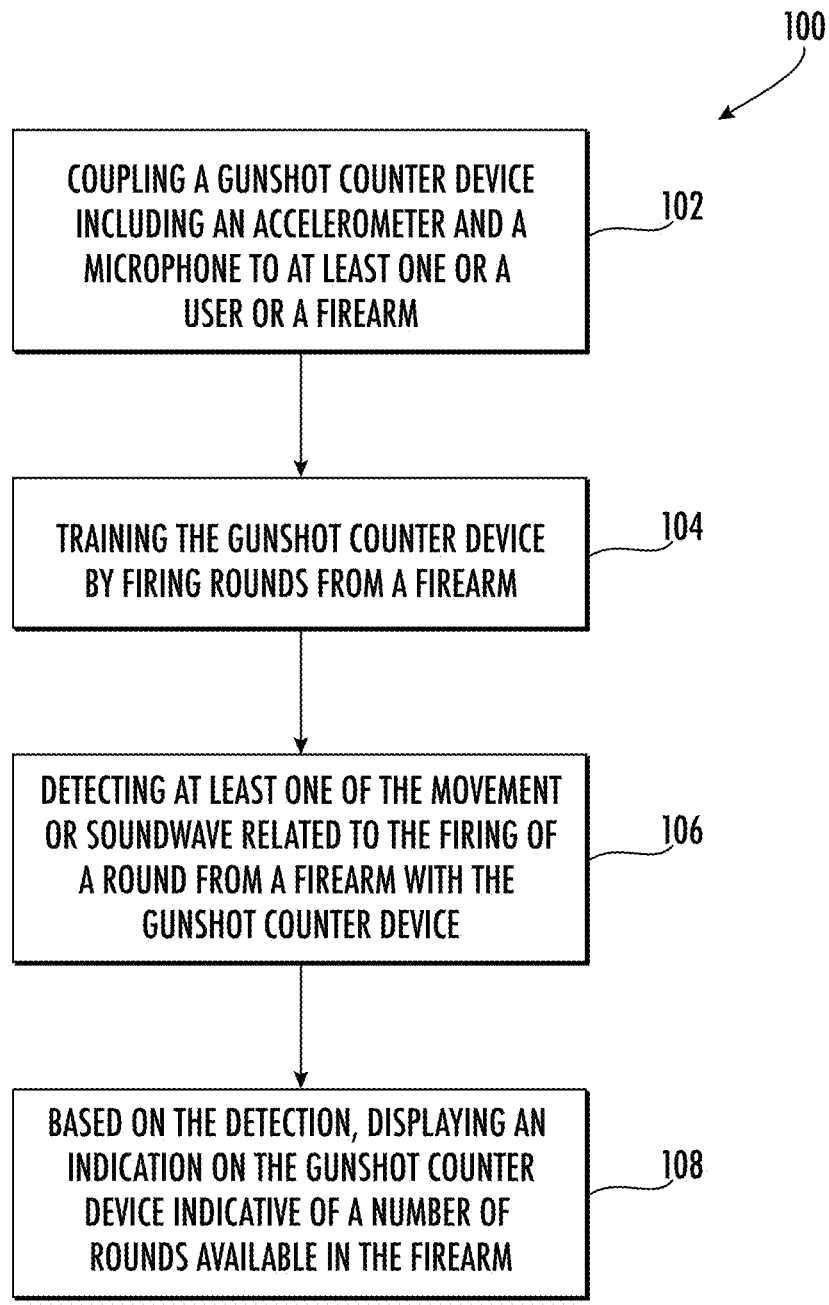
FIG. 10 depicts an example embodiment of a flow chart of a portion of an embodiment of a method of using a gunshot accounting device according to the present subject matter.

Referring to FIG. 10, an embodiment of a method 100 for detecting gunshots can comprise a step 102 of coupling a gunshot accounting device 10 as described above that can include one or more sensors, such as an accelerometer and a microphone, for example, to a user that is carrying a firearm and may be forced to use the firearm. To increase the accuracy of the detection by the gunshot accounting device 10, the step 104 of training the device is provided by having the user firing rounds from the firearm, for example, as described above. The step 104 of training the device can comprise training an artificial intelligence used by the gunshot accounting device 10. For example, in some embodiments, the training the artificial intelligence used by the gunshot accounting device 10 to recognize markers within extracted features pulled from sensor data by a filter that identify that a round has been fired by a firearm. In some embodiments, the training the artificial intelligence comprise firing a series of the rounds from the firearm under predetermined conditions within a given time frame. In some embodiments, the training of the AI system on the gunshot accounting device 10 can be continual. Once a certain level of training has occurred, the step 106 of detecting at least one of motion or soundwaves related to the firing of a round from a firearm with the gunshot counter device 10 can occur. Based on the detection, the step 108 of displaying an indication on the gunshot counter device indicative of a number of rounds available in the firearm can be performed.

Figure 11:
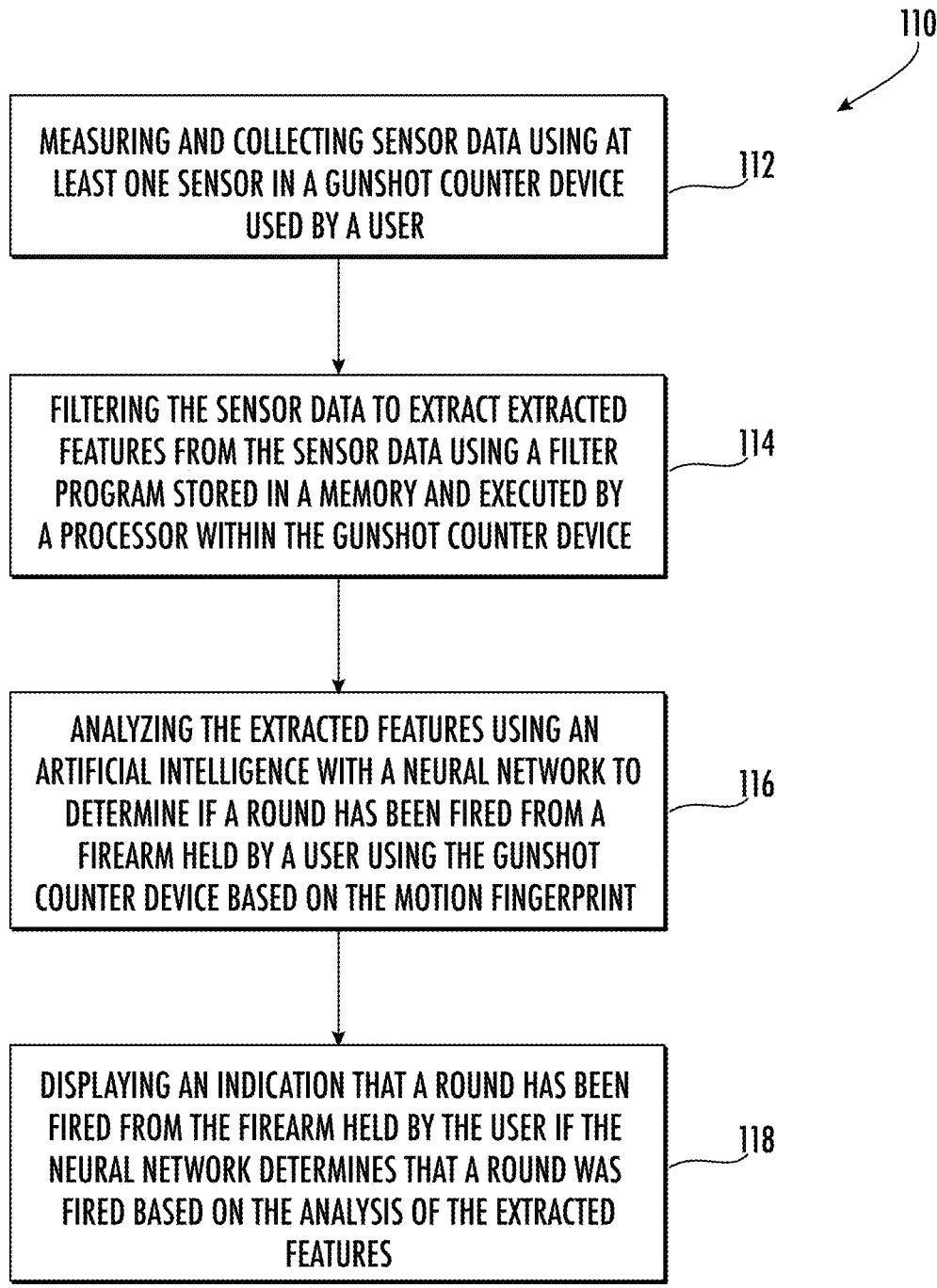
FIG. 11 depicts an example embodiment of a flow chart of a portion of an embodiment of a method of using a gunshot accounting device according to the present subject matter.

Referring to FIG. 11, another embodiment of a method 110 of detecting and tracking rounds fired from a firearm using a gunshot accounting device is provided. The method 110 can comprise the step 112 of collecting sensor data from at least one sensor in a gunshot accounting device used, by a user. The method 110 can also comprise the step of analyzing the sensor data to determine if a round has been fired from a firearm that the user is using. For example, the step of analyzing the sensor data can comprise the step 114 of filtering the sensor data to extract extracted features from the sensor data using a filter program stored in a memory and executed by a processor within the gunshot accounting device. The step of analyzing the sensor data can also comprise the step 116 of analyzing the extracted features using an artificial intelligence with a neural network to determine if a round has been fired from a firearm held by a user using the gunshot accounting device based on the motion fingerprint. The method 110 can also comprise the step 118 of displaying an indication that a round has been fired from the firearm held by the user if the neural network determines that a round was fired based on the analysis of the extracted features.

In some embodiments of the method 110, the at least one sensor can comprise at least one motion sensor, such an accelerometer, gyroscope, or magnetometer, in the gunshot accounting device used by the user. In such embodiments the step 112 of collecting sensor data can comprise collecting motion data from at least one motion sensor in a gunshot accounting device used by a user. In some such embodiments of the method 110, the step 114 of filtering the data can comprise filtering the motion data to extract extracted features from the motion data to produce a motion fingerprint using a filter program stored in a memory and executed by a processor within the gunshot accounting device, while the step 116 of analyzing the extracted features can comprise analyzing the motion fingerprint using a neural network to determine if a round has been fired from a firearm held by a user wearing the gunshot accounting device based on the motion fingerprint. In some embodiments of the method 110, the step 116 of analyzing the extracted features can comprise analyzing the motion fingerprint by the neural network using a sliding time detection window to identify markers within the motion fingerprint that are indicative of a round being fired from a firearm held by the user. In some embodiments of the method 110, the step 116 of analyzing the extracted features can comprise analyzing the motion fingerprint by the neural network using sliding time detection double detection windows with two detection windows that have an overlapping portion to identify markers within the motion fingerprint that are indicative of a round being fired from a firearm held by the user. In some embodiments of the method 110, the step 114 of filtering the data can comprise extracting identifying data points for the motion data and plotting the extracted data points on a coordinate system.

In some embodiments of the method 110, the at least one sensor can comprise one or more microphones configured to measure sound and produce audio data. In such embodiments, the step 112 of collecting sensor data can comprise collecting audio data from the one or more microphones in the gunshot accounting device. In some such embodiments of the method 110, the step 114 of filtering the data can comprise filtering the audio data to extract extracted features from the audio data to produce a sound fingerprint using the filter executed by the processor within the gunshot accounting device. In some such embodiments of the method 110, the step 116 of analyzing the extracted features can comprise analyzing the sound fingerprint using the neural network to confirm if a round has been fired from a firearm held by a user using the gunshot accounting device based, on the sound fingerprint.

In some embodiments, the method 110 can further comprise training the artificial intelligence to recognize markers within the extracted features that identify that a round has been fired by a firearm. In some such embodiments of the method 110, the step of training the artificial intelligence can comprise firing the at least one sensor comprises a series of the rounds from the firearm under predetermined conditions within a given time frame.

The present subject matter also provides one or more non-transitory computer-readable media comprising instructions that when executed by one or more computing devices cause the one or more computing devices to perform operations that can comprise collecting sensor data from at least one sensor in a gunshot accounting device used by a user and analyzing the sensor data to determine if a round has been fired from a firearm held by a user using the gunshot accounting device. The operations can also comprise displaying an indication that a round has been fired from the firearm held by the user if the neural network determines that a round was fired based on the analysis of the extracted features. In some embodiments, the operation of analyzing the sensor data can comprise filtering the sensor data to extract extracted features from the sensor data using a filter program stored in a memory and executed by a processor within the gunshot accounting device. The operation of analyzing the sensor data also can comprise analyzing the extracted features using an artificial intelligence with a neural network to determine if a round has been fired from a firearm held by a user using the gunshot accounting device based on the motion fingerprint.

In some embodiments, the rounds themselves could be 'preprogrammed' and/or 'fitted' with individual RFID chip with a corresponding sensor (in the firearm) built into the production model firearm where the round could be counted and displayed as provided above or preloaded. In some embodiments either a magazine or firearm could be fitted with an internal laser reader and when the beam was interrupted, the counted round passed through the breach or barrel (upon firing) it could be recognized as leaving the firearm and displayed as provided above. Additionally, in some embodiments the companion system ammunition may be configured to carry a specific chemical (blended with the propellant) that can emit specific and easily identified olfactory (smells) signals to the user that the number of rounds left for firing are at a critical point. For example, a 10-round magazine can be loaded with nine routine bullets and one olfactory bullet loaded in the third position from the end of the firing sequence. Subsequently, the user would know that upon sensing the smell of, this particular bullet there were two rounds left in the magazine.

In some embodiments, a device tampering can be provided in the gunshot accounting device that, upon receiving instructions, can send a charge to memory to destroy past info and software. In some embodiments where the gunshot accounting devices are used in a team setting, such as with a SWAT team or a military action, the gunshot accounting devices can be configured to provide cross-communication with other devices, potentially sharing team information, for example, who has ammunition remaining and low much is available between the team.

The system may collect and process data including sensed or measured data and analytics. Through the use of an AI system, it could be possible to develop algorithms to predict patterns in the firing sequence timing, motion fingerprint, sound wave and other data. Mobile smart device, such as smartphones, can be used in conjunction with the gunshot accounting devices in a gunshot counter system to access a SaaS dashboard for training and review of analytics and historic data. Such devices can also be used to communicate with a server and potentially other gunshot devices. Short time sequence of multiple round shots may limit pushing certain analytics to a mobile computing device in a gunshot counter system.

The gun shot counter devices and systems disclosed herein can have a date/time stamped recording option to not only count the rounds leaving the host firearm being tracked, but also recording other gunshots in the immediate vicinity. Such information would be helpful for the authorities when the gunshot accounting devices are used by law enforcement after any incident to help resolve any misdirected claims that might arise from a law enforcement shooting incident.

Location data may be collected from the gunshot accounting devices 10, including but limited to: GPS coordinates, router, and network information such as subnet, IP, gateway, MAC address, connected devices, WFPS, and Bluetooth beacons. Additional demographic data and contextual data may be compiled through third party sources (such as from public record and third-party data services), or may be manually entered, such as: name, age, places of business, restaurants, parks, attractions, neighborhoods and more. The gun shot counter devices may also include or be in communication with other computing devices which sense biofeedback signals. This data may be stored in both a relational and time-series structure in order to build a history of behavior for users.

Data may be used in both an aggregate structure to understand the behavior of general, users and at an individual level to understand the behavior of a specific user. Data may be cleaned, missing data will be interpolated, masked, or otherwise statistically accounted for. Outliers, corrupted data, and other interference may be either masked, removed, or statistically moderated. For the general-purpose algorithm, data may be standardized and normalized across users to account for outliers and variance in the data. Data for individual user models may have additional user specific pre-processing, based on the variance and statistical distribution of the user's specific data.

After data has been processed, valuable features in the data may be extracted that may be used to make predictions. Statistical models and machine learning techniques including but not limited to Hidden Markov models (HMM), deep feedforward neural networks, convolutional neural networks, and recurrent neural networks may be used. A combination of HMI methods and a deep neural network approach may be used to make predictions. The HSM approach typically excels in environments when time or computational power is limited (e.g., live use in the field). The deep learning, neural network approach typically excels once data is rich and computation i s available (e.g., synchronizing to cloud data sources while charging).

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A gunshot accounting device for detecting and tracking rounds fired from a firearm, the gunshot accounting device comprising:
    a housing that can be secured to at least one of a user or a firearm used by the user;
    a display secured to the housing;
    one or more sensors residing in the housing, the one or more sensors configured to collect sensor data; and
    a memory for storing computer program products and a processor residing in the housing and in communication with the one or more sensors and the display, the processor executing a filter and an artificial intelligence that comprises a neural network stored within the memory, the processor performing the steps of:
    receiving the sensor data from the one or more sensors in the gunshot accounting device;
    analyzing the sensor data using the filter and the artificial intelligence to determine if a round has been fired from a firearm held by a user using the gunshot accounting device; and
    displaying an indication on the display that a round has been fired from the firearm held by the user on the display if there is a determination that a round was fired based on the analysis of the sensor data; and
    wherein the one or more sensors comprises one or more motion sensors configured to collect motion data and the step performed by the processor of analyzing the sensor data comprises:
    filtering the motion data to extract extracted features from the motion data to produce a motion fingerprint using the filter executed by the processor within the gunshot accounting device; and
    analyzing the motion fingerprint using the neural network to determine if a round has been fired from a firearm held by a user using the gunshot accounting device based on the motion fingerprint.

2. The gunshot accounting device according to claim 1, wherein the housing is secured to with a wristband for securing the housing to a wrist of user, such that the one or more motion sensors are capable of measuring the movement of the wrist during the firing of a firearm and the recoil caused by the firing.

3. The gunshot accounting device according to claim 1, wherein the housing is secured to a firearm, such that the one or more motion sensors are capable of measuring the movement of the firearm during a firing of the firearm and the recoil caused by the firing.

4. The gunshot accounting device according to claim 3, wherein the housing is secured to a picatinny rail of a firearm.

5. The gunshot accounting device according to claim 1, wherein the motion sensor comprises an inertial measurement unit ("IMU") accelerometer comprising one or more accelerometers, one or more gyroscopes, and one or more magnetometers that measures movements based on an X, Y, Z coordinate system.

6. The gunshot accounting device according to claim 1, wherein the one or more sensors comprise one or more microphones configured to collect audio data and wherein the processor performing the steps of:
    receiving the audio data from the one or more microphones in the gunshot accounting device;
    filtering the audio data to extract extracted features from the audio data to produce a sound fingerprint using the filter executed by the processor within the gunshot accounting device;
    analyzing the sound fingerprint using the neural network to confirm if a round has been fired from a firearm held by a user using the gunshot accounting device based on the sound fingerprint.

7. The method according to claim 1, wherein the step of analyzing the motion fingerprint comprises analyzing the motion fingerprint by the neural network using a sliding time detection window to identify markers within the motion fingerprint that are indicative of a round being fired from a firearm held by the user.

8. The method according to claim 1, wherein the step of analyzing the motion fingerprint comprises analyzing the motion fingerprint by the neural network using sliding time detection double detection windows with two detection windows that have an overlapping portion to identify markers within the motion fingerprint that are indicative of a round being fired from a firearm held by the user.

9. A method of detecting and tracking rounds fired from a firearm using a gunshot accounting device, the method comprising;
    collecting sensor data from at least one sensor in a gunshot accounting device used by a user;
    analyzing the sensor data to determine if a round has been fired from a firearm held by a user using the gunshot accounting device; and
    displaying an indication that a round has been fired from the firearm held by the user if the neural network determines that a round was fired based on the analysis of the extracted features; and wherein the step of analyzing the sensor data comprises:
filtering the sensor data to extract extracted features from the sensor data using a filter program stored in a memory and executed by a processor within the gunshot accounting device; and
analyzing the extracted features using an artificial intelligence with a neural network to determine if a round has been fired from a firearm held by a user using the gunshot accounting device based on a motion fingerprint.

10. The method according to claim 9, wherein the at least one sensor comprises at least one motion sensor in the gunshot accounting device used by the user and the step of measuring and collecting comprises measuring and collecting motion data from at least one motion sensor in a gunshot accounting device used by a user.

11. The method according to claim 10, wherein the step of filtering the data comprises filtering the motion data to extract extracted features from the motion data to produce a motion fingerprint using a filter program stored in a memory and executed by a processor within the gunshot accounting device; and
the step of analyzing the data comprises analyzing the motion fingerprint using a neural network to determine if a round has been fired from a firearm held by a user wearing the gunshot accounting device based on the motion fingerprint.

12. The method according to claim 11, wherein the step of analyzing the motion fingerprint comprises analyzing the motion fingerprint by the neural network using a sliding time detection window to identify markers within the motion fingerprint that are indicative of a round being fired from a firearm held by the user.

13. The method according to claim 11, wherein the step of analyzing the motion fingerprint comprises analyzing the motion fingerprint by the neural network using sliding time detection double detection windows with two detection windows that have an overlapping portion to identify markers within the motion fingerprint that are indicative of a round being fired from a firearm held by the user.

14. The method according to claim 11, wherein the step of filtering the motion data comprises extracting data point from the motion sensor data and plotting the extracted measurements on a coordinate system.

15. The method according to claim 8, further comprises training the artificial intelligence to recognize markers within the extracted features that identify that a round has been fired by a firearm.

16. The method according to claim 15, wherein the step of training the artificial intelligence comprise firing a series of the rounds from the firearm under predetermined conditions within a given time frame.

17. The method according to claim 9, wherein the at least one sensor comprises one or more microphones configured to measure sound and produce audio data and the step of measuring and collecting comprises collecting audio data from the one or more microphones in the gunshot accounting device;
the step of filtering the data comprises filtering the audio data to extract extracted features from the audio data to produce a sound fingerprint using the filter executed by the processor within the gunshot accounting device; and
the step of analyzing the data comprises analyzing the sound fingerprint using the neural network to confirm if a round has been fired from a firearm held by a user using the gunshot accounting device based on the sound fingerprint.

18. A gunshot accounting system for counting and tracking rounds fired from a firearm, the gunshot accounting system comprising:
a first computing device having a memory and a processor; and
a gunshot accounting device for counting and tracking rounds fired from a firearm, the gunshot accounting device being in communication with the first computer device and the gunshot accounting device comprising:
a housing that can be secured to at least one of a user or a firearm used by the user;
a display secured to the housing;
at least one sensor residing in the housing, the sensor configured to collect sensor data; and
a memory for storing a filter and an artificial intelligence that comprises a neural network;
a processor residing in the housing and in communication with the at least one sensor and the display, the processor executing the filter and the artificial intelligence stored within the memory, the processor performing the steps of:
collecting sensor data from at least one sensor in a gunshot accounting device used by a user;
analyzing the sensor data to determine if a round has been fired from a firearm held by a user using the gunshot accounting device; and
displaying an indication that a round has been fired from the firearm held by the user if the neural network determines that a round was fired based on the analysis of the extracted features; and
wherein the step of analyzing the sensor data comprises:
filtering the sensor data to extract extracted features from the sensor data using a filter program stored in the memory and executed by the processor within the gunshot accounting device; and
analyzing the extracted features using an artificial intelligence with a neural network to determine if a round has been fired from the firearm held by the user using the gunshot accounting device based on a motion fingerprint.

19. The system according to claim 18, wherein the gunshot accounting device shares the sensor data collected from the at least one sensor and the analysis of the extracted features with the first computing device.

20. The system according to claim 19, wherein the processor of the first computing device executes instructions stored on the memory of the first computing device to further analyze the sensor data.

21. The system according to claim 18, wherein the first computer device comprises at least one a smartphone a laptop computing device or a remote computing device.

22. One or more non-transitory computer-readable media comprising instructions that when executed by one or more computing devices cause the one or more computing devices to perform operations comprising:
collecting sensor data from at least one sensor in a gunshot accounting device used by a user;
analyzing the sensor data to determine if a round has been fired from a firearm held by a user using the gunshot accounting device; and displaying an indication that a round has been fired from the firearm held by the user if a neural network determines that a round was fired based on the analysis of the extracted features; and wherein the operation of analyzing the sensor data comprises:
- filtering the sensor data to extract extracted features from the sensor data using a filter program stored in a memory and executed by a processor within the gunshot accounting device; and
- analyzing the extracted features using an artificial intelligence with a neural network to determine if a round has been fired from a firearm held by a user using the gunshot accounting device based on a motion fingerprint.

* * * * *